(12) United States Patent
Kimura et al.

(10) Patent No.: US 6,282,624 B1
(45) Date of Patent: Aug. 28, 2001

(54) NON-VOLATILE MEMORY APPARATUS INCLUDING FIRST AND SECOND ADDRESS CONVERSION TABLES STORED IN VOLATILE AND NONVOLATILE MEMORIES FOR IMPROVED ACCESS AT POWER UP

(75) Inventors: Tsunenori Kimura, Shiojiri; Yoshimasa Kondo, Matsumoto, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/191,437

(22) Filed: Nov. 12, 1998

(30) Foreign Application Priority Data

Nov. 13, 1997 (JP) .................................. 9-312121
Aug. 28, 1998 (JP) ................................. 10-243830

(51) Int. Cl.⁷ ............................ G06F 12/10; G11C 16/00
(52) U.S. Cl. ......................... 711/202; 711/103; 711/206; 713/2
(58) Field of Search ........................ 711/103, 115, 711/170, 202, 206, 207, 208, 209; 365/185.11, 185.22, 185.33; 713/1, 2

(56) References Cited

U.S. PATENT DOCUMENTS

| | | | |
|---|---|---|---|
| 5,524,230 | * 6/1996 | Sakaue et al. | 711/103 |
| 5,572,466 | * 11/1996 | Sukegawa | 365/185.33 |
| 5,740,396 | * 4/1998 | Mason | 711/103 |
| 5,742,934 | * 4/1998 | Shinohara | 711/103 |
| 5,812,814 | * 9/1998 | Sukegawa | 711/103 |
| 5,905,993 | * 5/1999 | Shinohara | 711/202 |
| 5,963,983 | * 10/1999 | Sakakura et al. | 711/202 |

\* cited by examiner

*Primary Examiner*—Glenn Gossage
(74) *Attorney, Agent, or Firm*—Hogan & Hartson, L.L.P.

(57) ABSTRACT

A non-volatile memory apparatus has a volatile memory device that stores a first address conversion table, and a non-volatile memory device that stores a second address conversion table. A physical location of the second address conversion table stored in the non-volatile memory device is obtained based on a logic sector address relative to a received request and the first address conversion table stored in the volatile memory device. The second address conversion table stored in the non-volatile memory device is obtained based on the physical location obtained by a first address obtaining device. Data is written in the non-volatile memory apparatus based on the logic sector address relative to the request received by a receiving device and the second address conversion table. The memory device also performs error correction check and correction, renews the second address conversion table. The second address conversion table is renewed in units of pages, the physical location in the non-volatile memory device is designated in units of blocks each containing a plurality of pages.

28 Claims, 13 Drawing Sheets

NON-VOLATILE MEMORY APPARATUS INCLUDING FIRST AND SECOND ADDRESS CONVERSION TABLES STORED IN VOLATILE AND NONVOLATILE MEMORIES FOR IMPROVED ACCESS AT POWER UP

BACKGROUND OF THE INVENTION

1. Field of the Invention

The present invention relates to a non-volatile memory apparatus, a method for controlling a non-volatile memory apparatus, and a data storage medium that stores a program for controlling a non-volatile memory apparatus. More particularly, the present invention relates to a non-volatile memory apparatus that is capable of writing and reading data by designating a logic sector address thereof and has a relatively short preparation time between the time power is turned on and the time reading and writing operations can be performed, a method for controlling such a non-volatile memory apparatus and a data storage medium storing a program for controlling such non-volatile memory apparatus.

Also, the present invention relates to memory cards such as ATA (AT Attachment) cards, SSFDC (Solid State Floppy Disk Card forum) cards, and the like in which locations to store data are designated by a designation method similar to that used for hard disks and floppy disks, a method for controlling the memory cards, and a data storage medium that stores a program to control the memory cards.

Furthermore, the present invention relates to a non-volatile memory apparatus having a flash EEPROM (Electrically Erasable Programmable Read Only Memory) and a RAM (Random Access Memory). In one aspect, conversion tables for converting logic sector addresses (that are designated upon data reading and data writing) into physical page addresses in the flash EEPROM are divided and stored in the flash EEPROM and the RAM. The present invention also relates to a method for controlling the non-volatile memory apparatus, and a data storage medium that stores a program to control the non-volatile memory apparatus.

Moreover, the present invention relates to a non-volatile memory apparatus that renews an address conversion table that is stored in a flash EEPROM in units of pages, and manages data to be stored in a flash EEPROM (including data sent from a host computer for reading and writing, as well as data for an address conversion table) in units of blocks each containing a plurality of pages, a method for controlling the non-volatile memory apparatus and a data storage medium that stores a program for controlling the non-volatile memory apparatus.

2. Description of Related Art

Memory cards such as ATA cards and SSFDC cards that are non-volatile memory apparatuses are becoming popular as external memory apparatuses for computers, and standardization of their specification is in progress.

In particular, a memory card according to the PC (Personal Computer) card standard or the PCMCIA (Personal Computer Memory Card International Association) standard operates as an external memory apparatus when connected to a host computer. When removed from the host computer, the memory card can be transferred or transported as a stand-alone unit while maintaining stored data. Even when the host computer is powered on, hot insertions and removals of the memory card can be performed. Because of these advantages, memory cards such as ATA cards are widely used, for example, as means for storing photographic data taken by a digital camera and transferring the data to a host computer.

When the host computer sends a request for writing data in or reading data from a memory card, such as an ATA card or an SSFDC card, an address that stores the data needs to be designated. When the storage location is designated, a set of integers called a logic sector address is used. Logic sector addresses are also used to designate data storage locations when data are read from or written in a hard disk or a floppy disk. A logic sector address is also called as a logic block address.

For example, for accessing a hard disk, a high speed processing can be achieved when data of a relatively large size, for example, 512 bytes of data is processed in one lot. Therefore, 512 bytes of data are treated together as a sector, and reading and writing operations are performed in units of sectors. For designating storage locations in a hard disk, cylinder numbers, head numbers and cluster numbers of the hard disk are used. In order to unify reading and writing processes, storage areas of a hard disk are arranged, virtually, in a line. The storage areas of the hard disk are divided in plural sectors and the sectors are numbered. The numbers are called logic sector addresses. Logic sector addresses can also be defined in a similar manner in the case of a floppy disk.

When a hard disk in a host computer is accessed, logic sector addresses are used for designating data storage locations. Accordingly, it is convenient in terms of development of applications and data management if the same method for designating data storage locations can be used for memory cards such as ATA cards and SSFDC cards. For this reason, the memory cards need to be controlled in such a manner that data storage locations can be designated by using logic sector addresses.

When a memory card is connected to a digital camera, and the digital camera reads data from or writes data in the memory card, logic sector addresses are used to designate data storage locations. In other words, the digital camera operates as a host computer described above.

The memory card has a non-volatile memory apparatus, in particular, a flash EEPROM in its interior. The flash EEPROM has a memory area that is formed from a single block or is divided into a plurality of blocks, and each block is formed from a single page or is divided into a plurality of pages. Each page is structured to have the same unit storage capacity for reading and writing in a hard disk. For example, each page is provided with a memory area that is capable of storing 512 bytes of data. Also, as widely practiced, each page may be provided with an additional storage area of 16 bytes as a redundancy area. Although one page contains 512 bytes in the former structure, and one page contains 528 bytes in the latter structure, both of the structures are common to each other to the extent that they are capable of storing 512 bytes of data.

Storage locations within a flash EEPROM are readily determined by designating chip numbers of chips, block numbers of blocks in the chips, and page numbers of pages in the blocks. Storage areas within a flash EEPROM are arranged, virtually, in a line, and are successively numbered page by page from the head storage area. The numbers are called physical page addresses. In other words, storage locations within a flash EEPROM can be designated by the physical page addresses.

On the other hand, storage areas within a flash EEPROM are arranged, virtually, in a line, and successively numbered in units of blocks from the head storage area. The numbers are called physical block addresses. In other words, storage locations within a flash EEPROM can also be designated by the physical block addresses.

In the present application, designation of storage locations by the physical page addresses or by the physical block addresses is generally called as designation of storage locations by "physical locations".

A flash EEPROM is an electrically erasable programmable read only memory. In other words, in principle, data can be written only once in an electrically erased page. Therefore, when data stored in any one of a plurality of pages is desired to be changed, the data in that page needs to be erased and then new data needs to be written. Further, flash EEPROMs are characterized in that the above-described erase operation is executed in units of blocks in order to reduce the number of devices and to increase the operation speed.

Other types of EEPROMs are equipped with a function of overwriting data in a page that already stores data. However, in most of the EEPROMs having the overwriting function of this type, the number of overwriting operations is limited. Also, there are a lot of other types of EEPROMs, which do not have the overwriting function.

The memory card converts a logic sector address designated by a host computer into a physical location, and performs writing and reading operations with respect to a page that is located at the physical location. However, for example, because of the limitation in the number of overwriting operations, the correspondence between a logic sector address and a physical page address is likely changed very frequently.

Conventionally, a memory card having a flash EEPROM of the type described above may also be equipped with a RAM in addition to the flash EEPROM. The RAM stores an address conversion table for converting a logic sector address into a physical location. When the correspondence between a logic sector address and a physical location is renewed, the address conversion table stored in the RAM is renewed. For example, an address conversion table is realized by an array having indexes defining logic sector addresses and values defining physical locations.

When a host computer issues requests to write data in the same logic sector address multiple times, the flash EEPROM may contain pages that store old data and pages that store new data. The pages that store old data need to be erased at appropriate timing. Therefore, it is necessary to manage page statuses including, for example, a status in which a page has been erased and no data has been written, a status in which a page has data already written and the written data is effective or valid, a status in which a page has data already written but the written data is not effective, and the like. Conventionally, such a status is stored in a redundant area in each page.

When the power to the memory card is turned off, contents of the RAM are erased. Therefore, when the power is turned on, an address conversion table is formed as an initial step. Therefore, correspondences between pages and logic sector addresses need to be stored in the flash EEPROM. Conventionally, a correspondence is stored in a redundant area in each page.

Furthermore, as described above, writing in the flash EEPROM is performed in units of pages, and an erasure is performed in units of blocks each containing a plurality of pages. It typically takes a long time to perform an erasure operation. In accordance with a conventional technique, when data that is stored in a specified page is renewed, an entire block that contains the specified page is temporarily copied onto the RAM, the entire block is erased, a portion that corresponds to the specific page among the data that has been copied onto the RAM is renewed, and the data in the RAM with the specified portion being renewed is returned to and written in the block.

When a memory card is used for a digital camera as an external memory device, the memory card should desirably be capable of saving as many high-resolution photos as possible. Also, in consideration of the convenience in storage and transportation of data, the memory card should desirably have a large amount of storage capacity as much as possible. Furthermore, there is a great demand to further increase the storage capacity of a memory card as the size of data increases as a result of the size of applications becoming greater and multimedia becoming more popular.

Also, according to the PC card standard, the size of memory cards is restricted, and therefore an area to dispose chips is restricted. Accordingly, the memory capacity of RAMs is restricted.

However, according to the conventional method, when the storage capacity of the memory card is made larger, the address conversion table also becomes larger, and the storage capacity of the RAM for storing the address conversion table needs to be made larger. Accordingly, the conventional method creates problems that result in increased costs and increased power consumption.

Also, according to the conventional method, correspondences between management sector addresses and physical locations are distributed and located in plural pages, and address conversion tables are formed in the RAM. As a result, reading operations to read data from numerous pages are required, and it takes a long time to construct an address conversion table. As a consequence, in accordance with the conventional method, a substantially long time elapses from the time the memory card is connected to the host computer until the time the computer is ready for writing data in or reading data from the memory card.

Furthermore, the conventional method suffers from other problems. For example, when a part of pages in a block is renewed, the entire block needs to be erased. Therefore, an erasure operation takes a long time, and it takes a long time to write data in the memory card. Also, if a power outage occurs when data in a block is temporarily stored in the RAM, the data in the block will be lost and cannot be restored.

SUMMARY OF THE INVENTION

It is an object of the present invention to provide a non-volatile memory apparatus that is capable of writing and reading operations by designating logic sector addresses, and has a short preparation time between the time power is turned on and the time reading and writing operations are ready. It is also an object of the present invention to provide a method for controlling the non-volatile memory apparatus, and a data storage medium that stores a program for controlling the non-volatile memory apparatus.

Also, it is an object of the present invention to provide a memory card, such as an ATA (AT Attachment) card, an SSFDC (Solid State Floppy Disk Card forum) card, and the like, in which data storage locations are designated by a designation method similar to or the same as that used for hard disks and floppy disks, a method for controlling the cards, and a data storage medium that stores a program to control the cards.

Furthermore, it is an object of the present invention to provide a non-volatile memory apparatus having a flash EEPROM and a RAM in which conversion tables for converting logic sector addresses to be designated upon data reading and data writing into physical page addresses in the flash EEPROM are divided and stored in the flash EEPROM and the RAM, a method for controlling the non-volatile memory apparatus, and a data storage medium that stores a program to control the non-volatile memory apparatus.

Also, it is an object of the present invention to provide a non-volatile memory apparatus that improves the reliability of data stored in a flash EEPROM, and is capable of correcting data even when a portion of the data is corrupted, a method for controlling the non-volatile memory apparatus, and a data storage medium that stores a program to control the non-volatile memory apparatus.

Moreover, it is an object of the present invention to provide a non-volatile memory apparatus that renews an address conversion table that is stored in a flash EEPROM in units of pages, and manages data to be stored in a flash EEPROM (including data sent from a host computer for reading and writing, as well as data for an address conversion table) in units of blocks, a method for controlling the non-volatile memory apparatus and a data storage medium that stores a program for controlling the non-volatile memory apparatus.

In the following description, the "address obtaining devices", "address conversion table forming device", "error correction device", and "address conversion table renewing device" may take the form of computer program code.

In accordance with a first embodiment of the present invention, a non-volatile memory apparatus includes a receiving device that receives one of a request to write data at a logic sector address and a request to read data from a logic sector address that is transmitted from a host computer, a volatile memory device that stores a first address conversion table, and a non-volatile memory device that stores a second address conversion table and data. Further, a first address obtaining device obtains a physical location of the second address conversion table stored in the non-volatile memory device based on the logic sector address relative to the request received by the receiving device and the first address conversion table stored in the volatile memory device. A second address obtaining device obtains the second address conversion table stored in the non-volatile memory device based on the physical location obtained by the first address obtaining device, and obtains a physical location in the non-volatile memory apparatus at which data is written or read based on the logic sector address relative to the request received by the receiving device and the second address conversion table. A data access device writes the data relative to the request which is received by the receiving device, or reads the data relative to the request which is received by the receiving device, with respect to the physical location of the non-volatile memory device obtained by the second address obtaining device.

In accordance with the first embodiment, there is provided a non-volatile memory apparatus that is capable of reading and writing data by designating a logic sector address. In accordance with the first embodiment, memory cards, such as ATA cards and SSFDC cards designate a data storage location by the same method as that used for hard disks and floppy disks.

Furthermore, the first embodiment is directed to a non-volatile memory apparatus having a flash EEPROM and a RAM in which conversion tables for converting logic sector addresses to be designated upon data reading and data writing into physical page addresses in the flash EEPROM are divided and stored in the flash EEPROM and the RAM.

In accordance with a second embodiment of the present invention, the non-volatile memory apparatus further includes an address conversion table forming device that checks a correspondence between the logic sector address and the physical location based on the second address conversion table stored in the non-volatile memory device to thereby form the first address conversion table, and stores the first address conversion table in the volatile memory device.

In accordance with the second embodiment, there is provided a non-volatile memory apparatus that has a short preparation time that elapses from the time the power is turned on until the time reading and writing operations are ready.

In accordance with a third embodiment of the present invention, the non-volatile memory apparatus further comprises an error correction device that, when the data access device writes in the non-volatile memory device the data relative to the request that is received by the receiving device, stores error correction check data for the data in the non-volatile memory device, and when the data relative to the request received by the receiving device is read, corrects an error of the read data based on the error correction check data stored in the non-volatile memory device.

In accordance with the third embodiment, there is provided a non-volatile memory apparatus that improves the reliability of data that is stored in the flash EEPROM, and is capable of correcting data even when a part of the data is corrupted.

In accordance with a fourth embodiment of the present invention, a non-volatile memory apparatus has an address conversion table renewing device that renews the second address conversion table stored in the non-volatile memory device so that a physical location of a storage area in the non-volatile memory device wherein data can be written is referred to instead of the physical location obtained by the second address obtaining device.

In accordance with the fourth embodiment, there is provided a non-volatile memory apparatus having a non-volatile memory device wherein even when a writing operation with respect to the non-volatile memory device is in principle limited to one single writing operation after data stored therein is erased, the non-volatile memory device is effectively managed.

In accordance with a fifth embodiment of the present invention, the address conversion table renewing device renews the second address conversion table in units of pages of the non-volatile memory device.

In accordance with a sixth embodiment of the present invention, in the non-volatile memory apparatus, the physical location in the non-volatile memory device that is stored in the second address conversion table is designated in units of blocks each containing a plurality of pages.

In accordance with a seventh embodiment of the present invention, a method for controlling a non-volatile memory apparatus is provided. The method includes a receiving step for receiving one of a request to write data at a logic sector address and a request to read data from a logic sector address that is transmitted from a host computer; a first address obtaining step, based on the logic sector address relative to the request received by the receiving step and a first address conversion table stored in a volatile memory device, for obtaining a physical location of a second address conversion table stored in a non-volatile memory device, a second address obtaining step for obtaining the second address conversion table stored in the non-volatile memory device based on the physical location obtained by the first address obtaining step, and obtaining a physical location in the non-volatile memory apparatus at which data is written or read based on the logic sector address relative to the request received by the receiving step and the second address conversion table; and a data access step for writing the data relative to the request which is received by the receiving step, or reads the data relative to the request which is received by the receiving step, with respect to the physical location of the non-volatile memory device obtained by the second address obtaining step. As a result, there is provided a method for controlling a non-volatile memory apparatus that is capable of reading and writing data by designating a logic sector address.

The seventh embodiment also provides a method for controlling memory cards, such as ATA cards and SSFDC cards that can designate a data storage location by the same method as that used for hard disks and floppy disks.

The method may be used in a non-volatile memory apparatus that has a flash EEPROM and a RAM in which conversion tables for converting logic sector addresses to be designated upon data reading and data writing into physical page addresses in the flash EEPROM are divided and stored in the flash EEPROM and the RAM.

In accordance with an eighth embodiment of the present invention, the method for controlling a non-volatile memory apparatus further comprises an address conversion table forming step that checks a correspondence between the logic sector address and the physical location based on the second address conversion table stored in the non-volatile memory device to thereby form the first address conversion table, and stores the first address conversion table in the volatile memory device.

In accordance with the eighth embodiment, there is provided a method for controlling a non-volatile memory apparatus that requires a short preparation time between the time power is turned on until the time reading and writing operations are ready.

In accordance with a ninth embodiment of the present invention, the method for controlling a non-volatile memory apparatus further comprises an error correction step that, when the data access step writes in the non-volatile memory device the data relative to the request that is received, stores error correction check data of the data in the non-volatile memory device, and when the data relative to the request is read, corrects an error of the read data based on the error correction check data stored in the non-volatile memory device.

In accordance with the ninth embodiment, there is provided a method for controlling a non-volatile memory apparatus that improves the reliability of data that is stored in the flash EEPROM, and is capable of correcting data even when a part of the data is corrupted.

In accordance with a tenth embodiment of the present invention, the method for controlling a non-volatile memory apparatus further includes an address conversion table renewing step for renewing the second address conversion table stored in the non-volatile memory device so that a physical location of a storage area in the non-volatile memory device wherein data can be written is referred to instead of the physical location obtained by the second address obtaining step.

In accordance with the tenth embodiment, there is provided a method for controlling a non-volatile memory apparatus having a non-volatile memory device wherein even when writing operation with respect to the non-volatile memory device is in principle limited to one single writing operation after data stored therein is erased, the non-volatile memory device is effectively managed.

In accordance with an eleventh embodiment of the present invention, the address conversion table renewing step in the tenth embodiment renews the second address conversion table in units of pages of the non-volatile memory device.

In accordance with a twelfth embodiment of the present invention, there is provided a method for controlling a non-volatile memory apparatus according to the seventh embodiment, wherein the physical location in the non-volatile memory device that is stored in the second address conversion table is designated in units of blocks each containing a plurality of pages.

In accordance with a thirteenth embodiment of the present invention, there is provided a data storage medium for storing a program that controls a non-volatile memory apparatus. The data storage medium is characterized in that the method comprises: a receiving step for receiving one of a request to write data at a logic sector address and a request to read data from a logic sector address that is transmitted from a host computer; a first address obtaining step, based on the logic sector address relative to the request received by the receiving step and a first address conversion table stored in a volatile memory device, for obtaining a physical location of a second address conversion table stored in a non-volatile memory device; a second address obtaining step for obtaining the second address conversion table stored in the non-volatile memory device based on the physical location obtained by the first address obtaining step, and obtaining a physical location in the non-volatile memory apparatus at which data is written or read based on the logic sector address relative to the request received by the receiving step and the second address conversion table; and a data access step for writing the data relative to the request which is received by the receiving step, or reads the data relative to the request which is received by the receiving step, with respect to the physical location of the non-volatile memory device obtained by the second address obtaining step.

In accordance with a fourteenth embodiment of the present invention, there is provided a data storage medium for storing a program that controls a non-volatile memory apparatus according to the thirteenth embodiment which further comprises an address conversion table forming step for checking a correspondence between the logic sector address and the physical location based on the second address conversion table stored in the non-volatile memory device to thereby form the first address conversion table, and stores the first address conversion table in the volatile memory device.

In accordance with a fifteenth embodiment of the present invention, there is provided a data storage medium for storing a program that controls a non-volatile memory apparatus according to the thirteenth embodiment which further comprises an error correction step for, when the data access step writes in the non-volatile memory device the data relative to the request that is received by the receiving step, storing error correction check data of the data in the non-volatile memory device, and when the data relative to the request received by the receiving step is read, correcting an error of the read data based on the error correction check data stored in the non-volatile memory device.

In accordance with a sixteenth embodiment of the present invention, there is provided a data storage medium for storing a program that controls a non-volatile memory apparatus according to the thirteenth embodiment which further comprises an address conversion table renewing step for renewing the second address conversion table stored in the non-volatile memory device so that a physical location of a storage area in the non-volatile memory device wherein data can be written is referred to instead of the physical location obtained by the second address obtaining step.

In accordance with a seventeenth embodiment of the present invention, there is provided a data storage medium for storing a program that controls a non-volatile memory apparatus according to the sixteenth embodiment, wherein the address conversion table renewing step renews the second address conversion table in units of pages of the non-volatile memory device.

In accordance with an eighteenth embodiment of the present invention, there is provided a data storage medium for storing a program that controls a non-volatile memory apparatus according to the thirteenth embodiment, wherein the physical location in the non-volatile memory device that is stored in the second address conversion table is designated in units of blocks each containing a plurality of pages.

In accordance with the thirteenth embodiment through the eighteenth embodiment, data storage media storing the programs can be readily sold or distributed as software products independently of non-volatile memory apparatuses. By operating the program stored in the data storage medium in accordance with the thirteenth embodiment through eighteenth embodiment, a non-volatile memory apparatus and a method for controlling a non-volatile memory apparatus in accordance with the above-described first embodiment through the twelfth embodiment are realized, and the same effects as those of the above-described embodiments are achieved.

In accordance with a nineteenth embodiment of the present invention, there is provided a non-volatile memory apparatus comprising: a receiving device that receives one of a request to write data at a logic sector address and a request to read data from a logic sector address that is transmitted from a host computer; a volatile memory device that stores a first address conversion table and a second address conversion table; a non-volatile memory device that stores a third address conversion table and data; a first address obtaining device that obtains a physical location of the second address conversion table stored in the volatile memory device based on the logic sector address relative to the request received by the receiving device and the first address conversion table stored in the volatile memory device; a second address obtaining device that obtains the second address conversion table stored in the volatile memory is device based on the physical location obtained by the first address obtaining device, and obtains a physical location of a third address conversion table stored in the non-volatile memory device based on the logic sector address relative to the request received by the receiving device and the second address conversion table; a third address obtaining device that obtains the third address conversion table stored in the non-volatile memory device based on the physical location obtained by the second address obtaining device, and obtains a physical location in the non-volatile memory apparatus at which data is written or read based on the logic sector address relative to the request received by the receiving device and the third address conversion table; and a data access device that writes the data relative to the request which is received by the receiving device, or reads the data relative to the request which is received by the receiving device, with respect to the physical location of the non-volatile memory device obtained by the third address obtaining device.

The nineteenth embodiment provides a non-volatile memory apparatus that has address conversion tables in multiple stages to be stored in non-volatile memory devices so that larger size of non-volatile memory can be managed.

In accordance with a twentieth embodiment of the present invention, there is provided a method for controlling a non-volatile memory apparatus. The method includes a receiving step for receiving one of a request to write data at a logic sector address and a request to read data from a logic sector address that is transmitted from a host computer; a first address obtaining step for, based on the logic sector address relative to the request received by the receiving device and a first address conversion table stored in a volatile memory device, obtaining a physical location of a second address conversion table stored in the volatile memory device; a second address obtaining step for obtaining the second address conversion table stored in the volatile memory device based on the physical location obtained by the first address obtaining step, and obtaining a physical location of a third address conversion table stored in a non-volatile memory device based on the logic sector address relative to the request received by the receiving step and the second address conversion table; a third address obtaining step for obtaining the third address conversion table stored in the non-volatile memory device based on the physical location obtained by the second address obtaining step, and obtaining a physical location in the non-volatile memory apparatus at which data is written or read based on the logic sector address relative to the request received by the receiving step and the third address conversion table; and a data access step for writing the data relative to the write request which is received by the receiving device, or reading the data relative to the request to read which is received by the receiving device, with respect to the physical location of the non-volatile memory device obtained by the third address obtaining device.

The twentieth embodiment provides a method for controlling a non-volatile memory apparatus that has address conversion tables in multiple stages to be stored in non-volatile memory devices so that data stored in the non-volatile memory devices can be managed in finer stages.

In accordance with a twenty-first embodiment of the present invention, there is provided a data storage medium storing a program that controls a non-volatile memory apparatus, characterized in that the method comprises: a receiving step for receiving one of a request to write data at a logic sector address and a request to read data from a logic sector address that is transmitted from a host computer; a first address obtaining step for, based on the logic sector address relative to the request received by the receiving device and a first address conversion table stored in a volatile memory device, obtaining a physical location of a second address conversion table stored in the volatile memory device; a second address obtaining step for obtaining the second address conversion table stored in the volatile memory device based on the physical location obtained by the first address obtaining step, and obtaining a physical location of a third address conversion table stored in a non-volatile memory device based on the logic sector address relative to the request received by the receiving step and the second address conversion table; a third address obtaining step for obtaining the third address conversion table stored in the non-volatile memory device based on the physical location obtained by the second address obtaining step, and obtaining a physical location in the non-volatile memory apparatus at which data is written or read based on the logic sector address relative to the request received by the receiving step and the third address conversion table; and a data access step for writing the data relative to the write request which is received by the receiving device, or reading the data relative to the read request which is received by the receiving device, with respect to the physical location of the non-volatile memory device obtained by the third address obtaining device.

In accordance with the twenty-first embodiment, data storage media storing the programs can be readily sold or distributed as software products independently of non-volatile memory apparatuses. By operating the program stored in the data storage medium in accordance with the twenty-first embodiment, a non-volatile memory apparatus and a method for controlling a non-volatile memory apparatus in accordance with the above-described other embodiments are realized, and the same effects as those of the above-described other embodiments are achieved.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 6 is a flowchart illustrating a process for forming a first address conversion table in a RAM when a memory card is powered on.

EMBODIMENTS OF THE PRESENT INVENTION

Embodiments of the present invention will be described below. It is noted that the embodiments are presented for illustrative purpose only to describe the present invention, and are not intended to limit the scope of the present invention. Therefore, a person having ordinary skill in the art may modify the embodiments described herein by using elements that are equivalent to those described herein. Accordingly, these modified embodiments are also included in the scope of the present invention.

Figure 1:
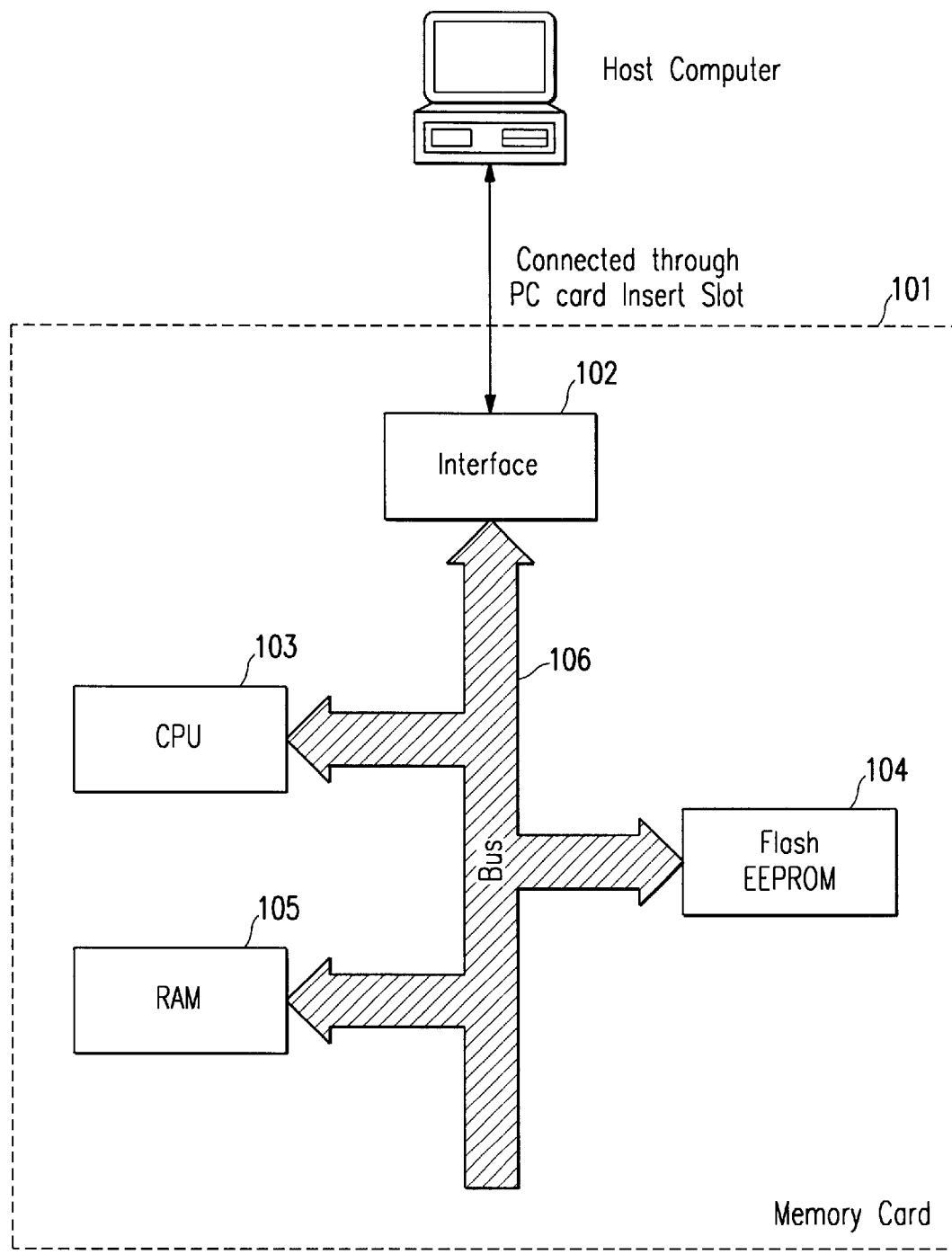
FIG. 1 is a block diagram of a basic structure of a non-volatile memory apparatus (memory card) in accordance with an embodiment of the present invention.

FIG. 1 shows a block diagram of a basic configuration of a non-volatile memory apparatus (memory card) in accordance with one embodiment of the present invention. A memory card 101 has an interface 102, a central processing unit (CPU) 103, a flash EEPROM 104 and a RAM 105 that are connected to one another through a bus 106.

The interface 102 receives requests to write or read data that are transmitted from a host computer, and sends responses to the requests to the host computer. Further, power from the host computer can be supplied through the interface 102. Also, when the memory card 101 is an ATA card, the interface 102 has a form and a configuration according to the PC card (PCMCIA) standard.

When the memory card 101 is connected to the host computer, and a power supply starts, the CPU 103 forms a first address conversion table based on a second address conversion table that is stored in the flash EEPROM 104, and stores the first address conversion table in the RAM 105.

When data writing and data reading processes are performed between the host computer and the memory card 101, an improved data transfer can be achieved by buffering data to be transferred, using the RAM 105.

The CPU 103 forms an image of data to be written in each of the pages of flash EEPROM 104, for example, an image of 528 bytes, in the RAM 105, and then writes them together in the specified pages of the flash EEPROM 104. At this time, a high-speed data transfer through the bus 106 can be achieved by a DMA (direct memory access) transfer device (not shown) of the CPU 103.

It is noted that an independent RAM may be provided as a buffer for data transfer and may be connected to the bus 106. This independent RAM is in addition to the RAM 105 that stores the first address conversion table.

The flash EEPROM 104 contains pages that mainly store data written by the host computer and pages that store second address conversion tables.

The CPU 103 also has a program ROM (not shown). The program ROM stores a program that controls the memory card. When the power is turned on, the CPU 103 loads the program stored in the program ROM, and then continuously executes the program for controlling the memory. The program ROM may be formed from an EEPROM so that a new memory-card controlling program that may be separately distributed can be stored in the EEPROM to update the old program with the new program.

Also, the CPU 103 has other RAMs that are used as temporary storage areas, for example, as registers, caches, and memories (not shown). Since read and write operations with respect to these storage areas do not need to be executed through the bus 106, a faster operation speed is achieved.

In accordance with a first embodiment of the present invention, data to be stored in a flash EEPROM and a second address conversion table to be stored in the flash EEPROM are both managed in units of pages, as described below.

Figure 2:
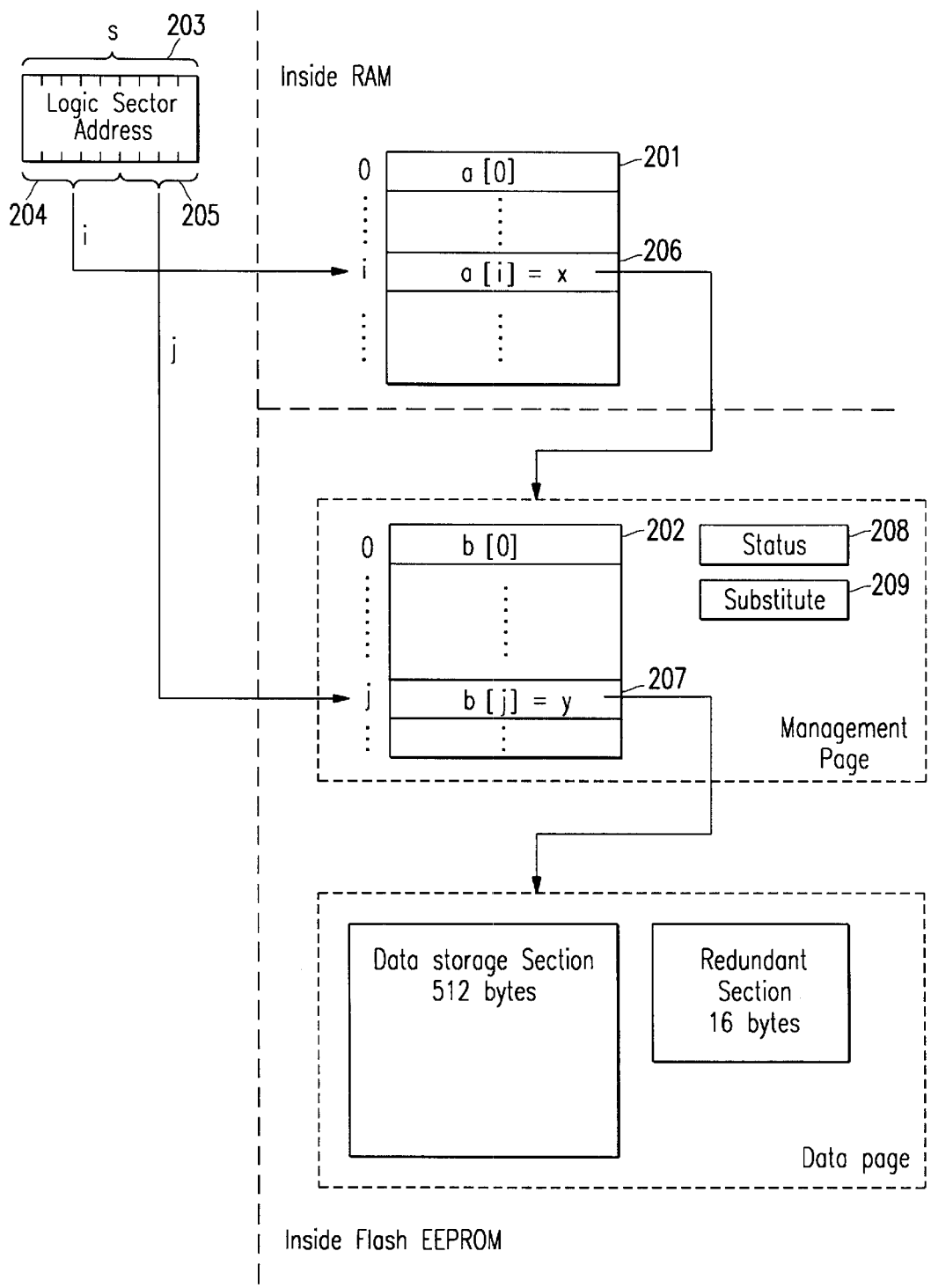
FIG. 2 is an explanatory view of an address conversion table in accordance with one embodiment of the present invention.
Figure 3:
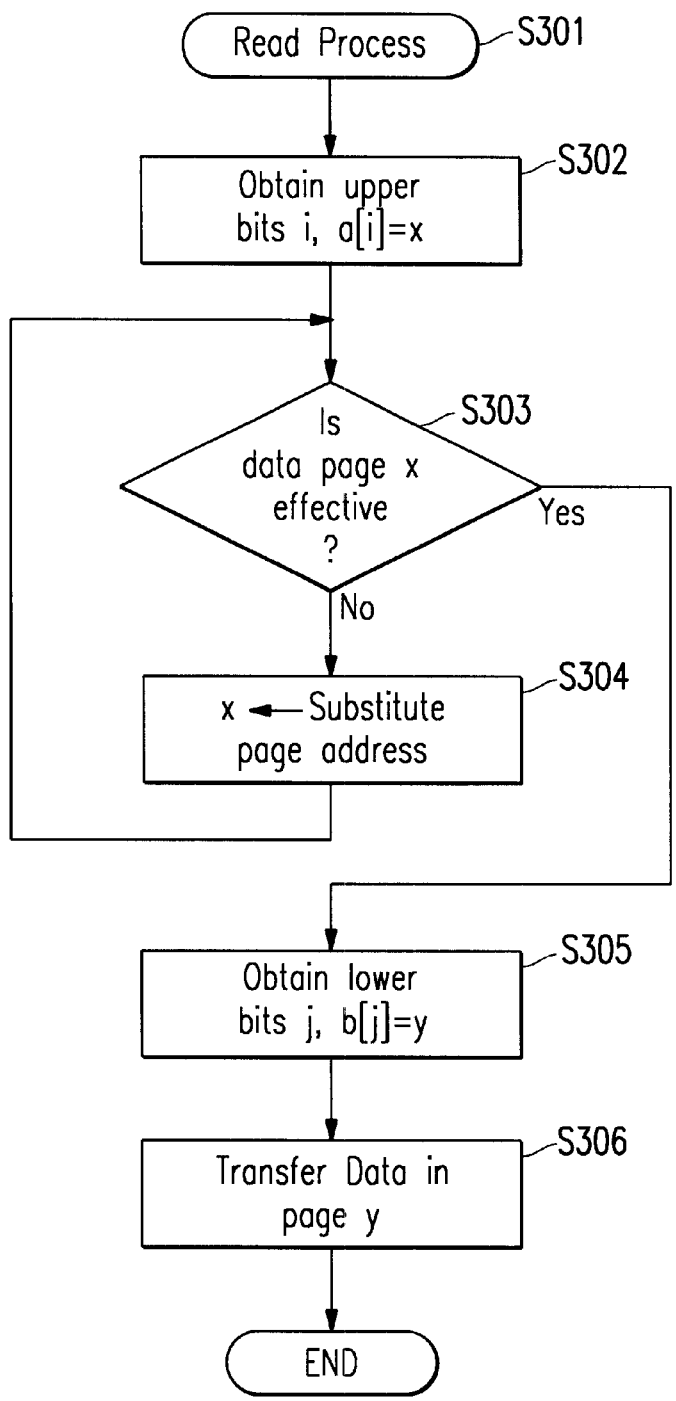
FIG. 3 is a flowchart of a process to be performed when a request to read data is received from a host computer in accordance with an embodiment of the present invention.

When the memory card 101 receives from the host computer a request to read data at a specified logic sector address, the request is processed in a manner described below with reference to FIG. 2 illustrating address conversion tables and to FIG. 3 illustrating a flowchart of the process.

As shown in FIG. 2, a first address conversion table 201 is stored in the RAM 105, and a second address conversion table 202 is stored in the flash EEPROM 104. The second address conversion table 202 has a size that can be stored in one page. Hereunder, a page that stores the second address conversion table 202 is called a management page.

The first address conversion table 201 and the second address conversion table 202 perform address conversion by using arrays. In the address conversion tables shown in FIG. 2, upper bits 204 of a logic sector address 203 are used as an index of the array of the first address conversion table 201, and lower bits 205 of the logic sector address 203 are used as an index of the array of the second address conversion table 202.

Each physical page address area 206, i.e., each element of the array of the first address conversion table 201 stores a physical page address of a page subjected to data reading or data writing.

Each physical page address area 207, i.e., each element of the array of the second address conversion table 202 stores a physical page address of a page subjected to reading of data or writing of data. Hereunder, the page subjected to reading of data or writing of data is referred to as a data page.

Further, the management page includes a physical page status area 208 and a substitution table physical page address area 209. The physical page status area 208 indicates as to whether or not a data page that is referred to by the physical page address area 207 of the array of the second address conversion table 202 contained in the management page is effective (hereinafter, being "effective" means that the data stored in a memory is effective or valid).

When the management page is not effective, in other words, when the value stored in the physical page status area 208 indicates that a data page referred to by the physical page address area 207 of the array of the second address conversion table 202 of the management page is not effective, the substitution table physical page address area 209 stores a physical page address of another management page to be used instead of the management page.

The flowchart shown in FIG. 3 will be described below. When a request to read data stored in a logic sector address s is received from the host computer, a reading process starts (step S 301).

First, the value of the upper bits of the logic sector address s are calculated. For example, when the calculated value is I, an I-th element (a [I]) in the array of the first address conversion table stored in the RAM 105 is obtained (step S 302). Let us assume that the element a[1] represents a value x. This value defines a physical page address of a management page that stores a second address conversion table.

Next, the management page located at the physical page address x in the flash EEPROM 104 is looked at, and the physical page status area 208 of the management page is checked to determine if the data page that is managed by the management page is effective (step S303).

Upon checking the physical page status area 208, if the checking result indicates that a data page that is managed by the management page is not effective (step S 303; NO), a value stored in the substitution table physical page address area 209 is used to substitute as the physical page address x (step S 304), and the process returns to step S 303.

When a data page that is managed by the management page is effective (step S 303; Yes), the value of the lower bits of the logic sector address s are calculated. When the calculated value is j, a j-th element (b[j]) in the array of the second address conversion table stored in the management page is obtained (step S 305). Let us assume that the element represents a value y. This value defines a physical page address of a data page that is subjected to a data-reading operation.

Lastly, data stored in the data page whose physical page address in the flash EEPROM 104 is y is transferred to a buffer within the RAM 105, and further the data is transferred through the interface 102 to the host computer as a response to the request (step S 306), and the process ends.

It should be appreciated from the above that when a read request is issued, the address convention tables and pages do not need to be renewed at all.

In the above-described embodiment, the upper bits 204 of the logic sector address 203 are used as an index of the array of the first address conversion table 201, and the lower bits 205 of the logic sector address 203 are used as an index of the array of the second address conversion table 202. However, their correspondences may be inverted with one another in accordance with another embodiment. More specifically, the upper bits 204 of the logic sector address 203 may be used as an index of the array of the second address conversion table 202, and the lower bits 205 of the logic sector address 203 may be used as an index of the array of the first address conversion table 201. Also, a part of the bits of the logic sector address may be ignored in still another embodiment.

When the memory card 101 receives from the host computer a request to write data at a specified logic sector address s, the request is processed in a manner described below with reference to a flowchart shown in FIG. 4.

When the memory card 101 receives from the host computer a request to write data at the logic sector address s, a writing process starts (step S 401).

First, the data to be written sent from the host computer is transferred to a buffer within the RAM 105 (step S 402).

Next, the same process executed in steps S 303~S 304 (FIG. 3) for processing a request to read data is executed to obtain a physical page address x of a management page that manages a data page in which the data is written, and a physical page address y of the data page (step S 403).

Next, a determination is made as to whether or not data has already been written in the data page located at the physical page address y of the flash EEPROM (step S 404).

The determination as to whether or not data has already been written in the data page may be made, using a value stored in a specified area of a redundant section of the data page, for example, in a one-byte management data area at a specified location. When a flash EEPROM is read at the time when an erasure operation has been performed but a writing operation has not been performed, a value having all bits being one (in another embodiment, all bits being zero) is obtained.

Therefore, when data is written in the data page in a later step S 410, a value other than 255 (11111111 in a binary number and 0xFF in a hexadecimal number) should always be stored in the management data area. Accordingly, when the management data area has a stored value of 0xFF, a determination is made in that data has not been written in the page. When the management data area has a stored value other than 0xFF, a determination is made in that data has already been written in the page.

When the management data area has a stored value other than 0xFF (step S 404; No), data has already been written in the data page. In this case, a page in which data has not been written is searched for in the flash EEPROM 104 (step S 405).

When a page in which data has not been written is not found (step S 405; No), a garbage collection process is performed to erase data pages and management pages that still hold old unnecessary data to thereby obtain pages in which no data are written (step S 406).

When pages in which data has not been written are found (step S 405; Yes), two new pages are obtained (step S 407). One of the two pages is used as a new management page, and the other is used as a data page in which data is written according to a write request. Let us assume that the former page is located at a physical page address p, and the latter page is located at a physical page address q. Pages p, q, x and y are then renewed (step S 408).

Figure 5A:
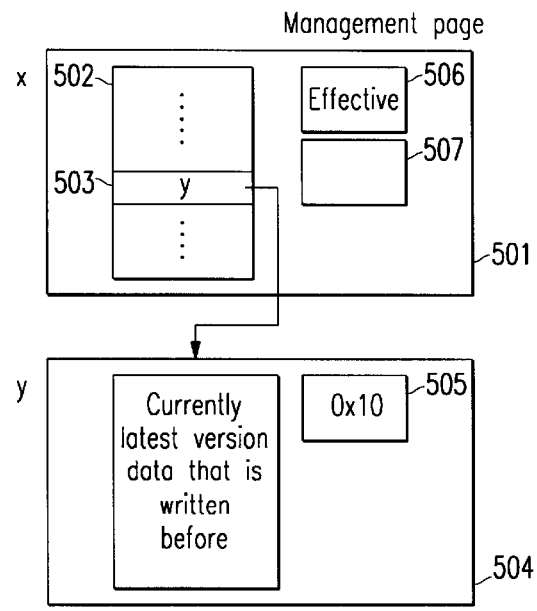
FIGS. 5(a) and 5(b) are explanatory views illustrating relations between pages when a new page is obtained and relations between a management page and a data page are renewed.
Figure 5B:
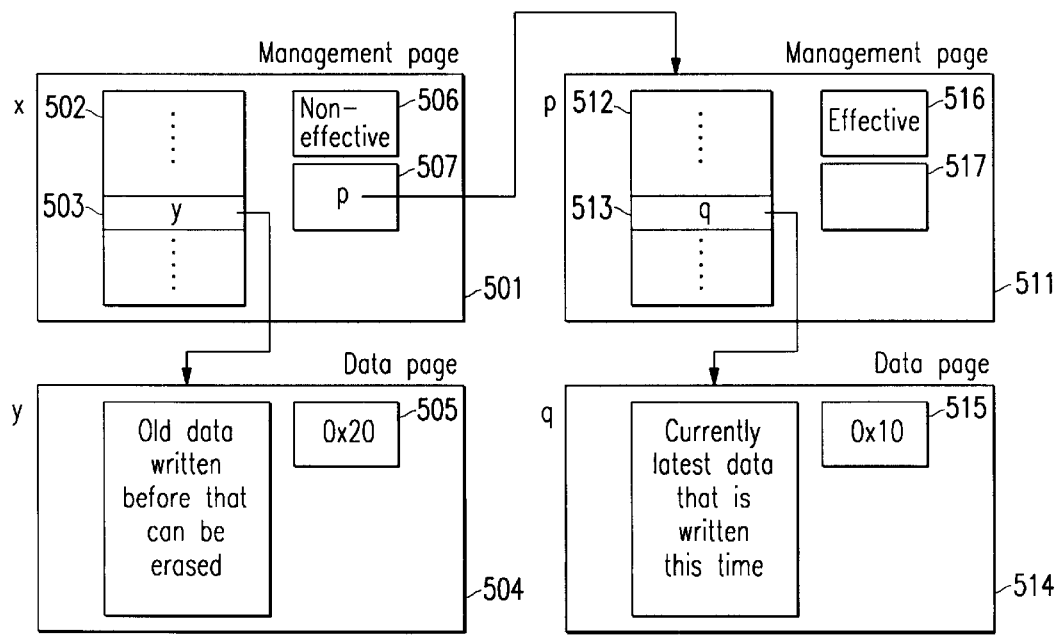

FIGS. 5(a) and 5(b) are explanatory views illustrating a renewal operation for renewing management pages and data pages. FIG. 5(a) shows the status of a management page 501 that is disposed at a physical address x. An array of a second address conversion table 502 in the management page 501 contains an element 503 that stores a physical page address y, and a data page 504 that is disposed at the physical page address y has already been written. Accordingly, a value other than 0xFF is stored. The figure shows a value "0x10", which means "data is already written". A physical page status area 506 of the management page 501 stores a value that means "effective".

As shown in FIG. 5(b), a physical page status area 506 of the management page 501 that is disposed at the physical page address x stores a value indicating "non-effective", and a substitution table physical page address area 507 stores a physical page address p of a management page that is newly obtained. The values stored in the physical page status area 506 and the substitution table physical page address area 507 are renewed by the write-over function of the flash EEPROM. In accordance with the present invention, the over-writing function with respect to these areas is performed, generally, one time. Therefore, the limitation of the over-write function of widely prevailed flash EEPROMs is overcome.

Values of elements in an array of a second address conversion table 512 that is stored in a management page 511 disposed at the physical address p are basically the same as those of the respective elements in the array of the second address conversion table 502 that is stored in the management page 501. However, there is a difference in that an element 513 corresponding to the element 503 storing the value y among the elements of the array of the second address conversion table 502 stores a value q. Also, a physical page status area 516 of the management page 511 stores a value indicating "effective".

Data that is transferred to the RAM 105 in response to the write-request is written in a data page 514 disposed at a physical page address q. Also, a management data area 515 of the data page 514 stores a value 0x10 that means "data has been written".

In FIG. 5(b), a value stored in the management data area 505 of the data page 504 that stores the "old" data at the physical page address y has been renewed to 0x20 by the over-write function of the flash EEPROM. This means that the above-described garbage collection process (step S 406) can erase this page in the future.

Figure 4:
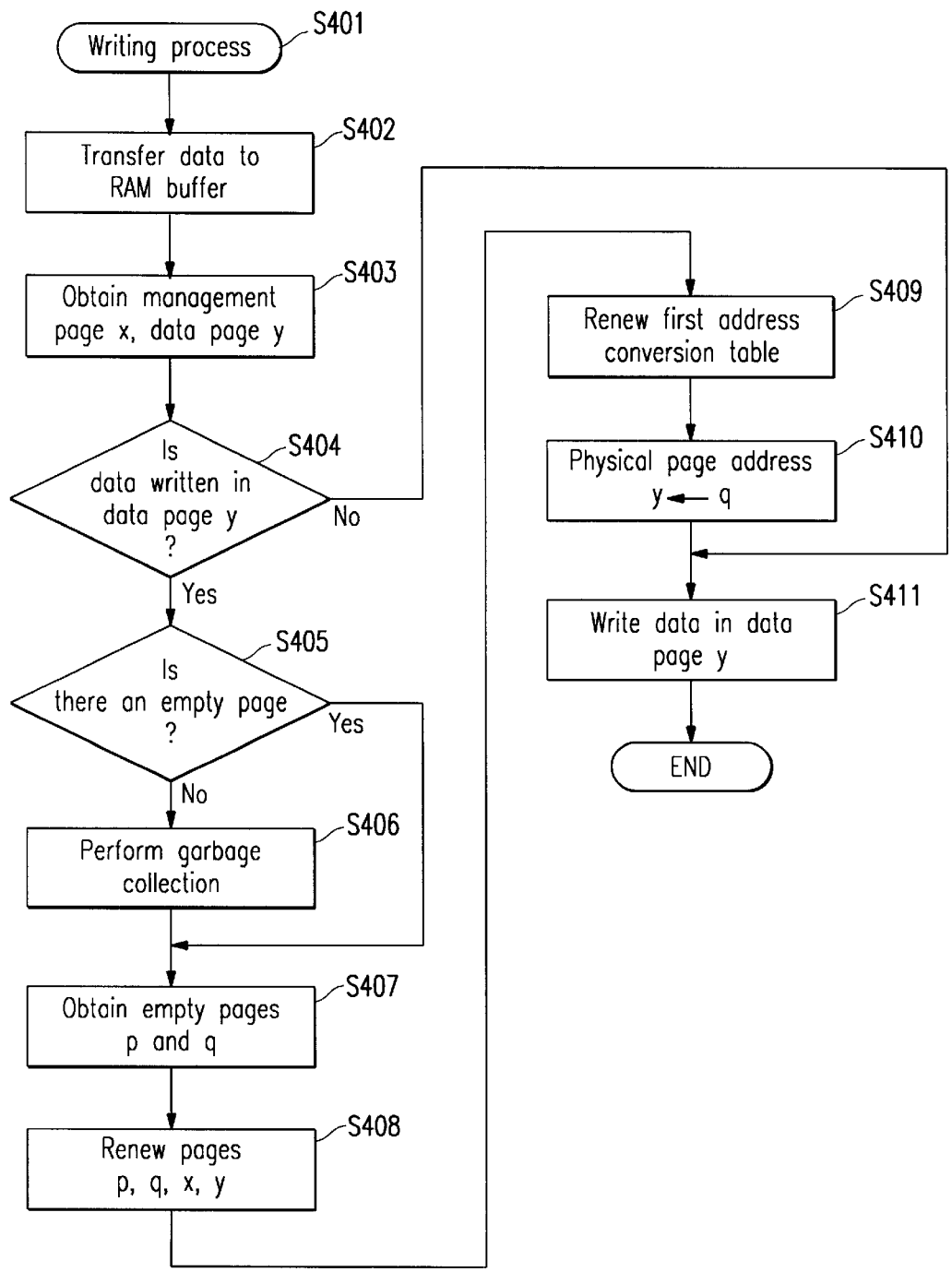
FIG. 4 is a flowchart of a process to be performed when a request to write data is received from a host computer in accordance with an embodiment of the present invention.

In the manner described above, a renewal and value-setting process is performed in step S 408 in FIG. 4 to renew the status shown in FIG. 5(a) with the status shown in FIG. 5(b).

Then, the first address conversion table stored in the RAM 105 is renewed (step S 409 in FIG. 4). In other words, the value of the element (representative of the physical page address x) disposed in the array of the first address conversion table is renewed with the physical page address p. By this process, the first address conversion table 201 always stores a physical page address of the latest "effective" management page.

When the writing operation or the reading operation is performed, at the beginning of each of the operations, a process (having steps that are the same as steps S 303~step S 304 and step S 403) is performed to reach the latest "effective" management page by referring to the substitute table physical page address area 209 while the physical page status area 208 indicates an invalid status. Therefore, this process is optional, and may not have to be performed at this moment but may be performed at the time of the garbage collection process.

The physical page address q of the data page that is newly obtained is used as the physical page address y (step S 410), and the process proceeds to step S 411.

On the other hand, when the management data area stores a value 0xFF (step S 404; Yes), this means that, after data in the related data page was erased, new data has not been written in the data page. Therefore, data can be written in the data page.

Data stored in the buffer within the RAM 105 is written in the data page located at the physical page address y in the flash EEPROM 104 (step S 411), and the process is completed.

A write request from the host computer may relate to plural sectors. In this case, the write request designates a logic sector address at which a writing operation is started, and the numbers of sectors in which data are written.

In this case, a writing operation is performed with respect to the sectors one sector by one sector in accordance with a control process shown in the flowchart of FIG. 4, and the address conversion table can be renewed. However, in this case, many pages are used for second address conversion tables, and many of the second address conversion tables immediately become invalid, lowering the usage efficiency.

To solve this problem, renewal of address conversion tables is preferably performed for a plurality of designated sectors together.

In the above-described embodiment, a value 0x10 (for a page in which data is already written) and a value 0x20 (for a page in which data can be erased) are used as values to be stored in management data areas. Values other than 0x10 and 0x20 may be used, as long as they are not 0xFF.

Figure 6:
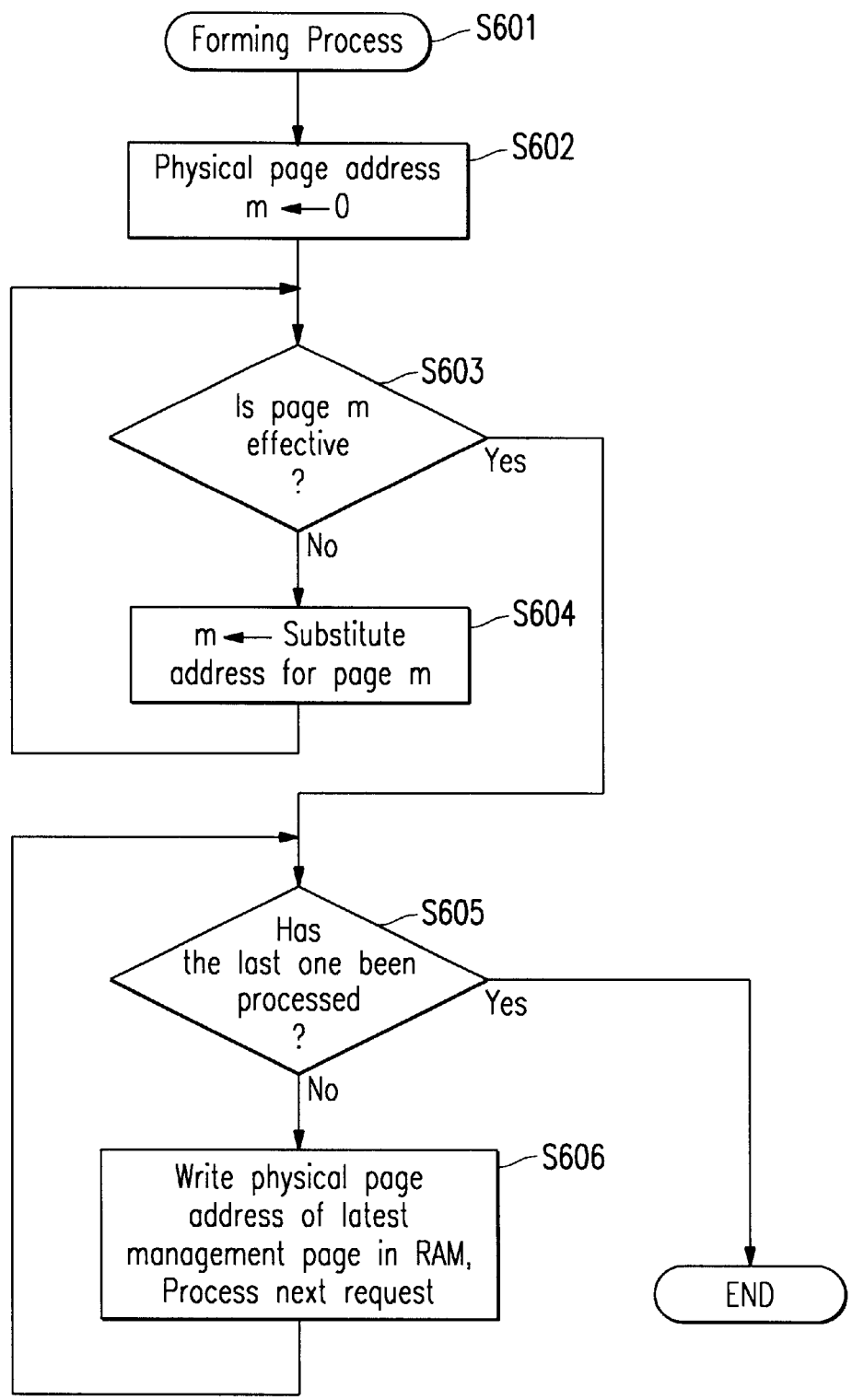

A preparation process to be performed when the power is supplied to the memory card 101, in other words, a process for forming a first address conversion table 201, in accordance with the present embodiment, will be described below with reference to a flowchart shown in FIG. 6.

As described above, in accordance with the present invention, data used for management and data to be stored by the host computer are both stored in non-volatile memories. Accordingly, a system is required to distinguish a management page from a data page.

The system is accomplished by link pages. A single link page or a plurality of link pages are disposed at a fixed physical page address in the flash EEPROM.

A link page stores an array containing elements each including an index representative of upper bits 204 of a logic sector address 203 and a value representative of a physical page address of a management page that has a second address conversion table. In other words, an array stored in a link page contains values similar to those stored in the first address conversion table 201 that is stored in the RAM 105.

Values of elements stored in a link page can be renewed by using the over-write function of a flash memory at the same time when values of elements in the first address conversion table 201 are renewed. When the over-write function cannot be performed any more due to the limitation of the number of over-writing operations, data indicating that the link page becomes "invalid" and a physical page address of a new link page are stored in a redundant section, and the same value stored in the first address conversion table 201 can be stored in the new link page.

Data indicating whether or not the link page is "effective" is stored in the same area of the management data area 505 of the redundant section of the data page. Also, the area that stores the physical page address of the new link page is called a substitute link page physical page address area. The substitute link page physical page address area may be located either in the redundant area or other areas of the page in a similar manner as the substitute table physical page address area 209. In particular, both of them can be placed in the same area within the page.

If the first physical page address can be erased when the garbage collection process is performed, a certain technique may be employed. For example, the latest first address conversion table 201 can be written and copied.

A process for forming the first address conversion table 201 in the RAM 105 will be described with reference to a flowchart shown in FIG. 6. When the power is turned on, the process starts (step S 601).

A value 0 is used as a physical page address m of a link page (step S 602). Then, a value stored in the management data area 505 in the redundant section of a page located at the physical page address m is checked to determine whether the page is effective (step S 603).

When a determination is made according to the value stored in the management data area 505 that the page located at the physical address m is not "effective" (step S 603; No), a physical page address stored in a substitute link page physical page address area is used as a new value m for the page located at the physical page address m (step S 604), and the process returns to step S 603.

When a determination is made that the page located at the physical page address m is "effective" (step S 603; Yes), the page is determined as a link page, and the following process is repeated for elements in the array of the link page.

A determination is made as to whether the last element has been processed (step S 605). When the last element has been processed, the process ends (step S 605; Yes).

When the process has not reached the last element (step S 605; No), step S 606 is performed. During this step, a physical page address that is stored in a present element is obtained, and the same steps as steps S 303~S 304 (FIG. 3) and step S 403 (FIG. 4) are performed for a management page located at the physical page address, to thereby obtain a physical page address of the latest management page. The physical page address is stored in the RAM 105, the array of the first address conversion table 203 is successively set, and the process returns to step S 605.

In a manner described above, the first address conversion table 201 is formed when the power is turned on. In accordance with the present invention, since address conversion tables are divided in a plurality of stages, the size of the first address conversion table formed in the RAM 105 can be relatively small. This results in a reduced storage capacity of the RAM 105, and a shorter preparation time that elapses from the moment the power is turned on until the moment reading and writing operations become ready for the memory card.

Figure 7:
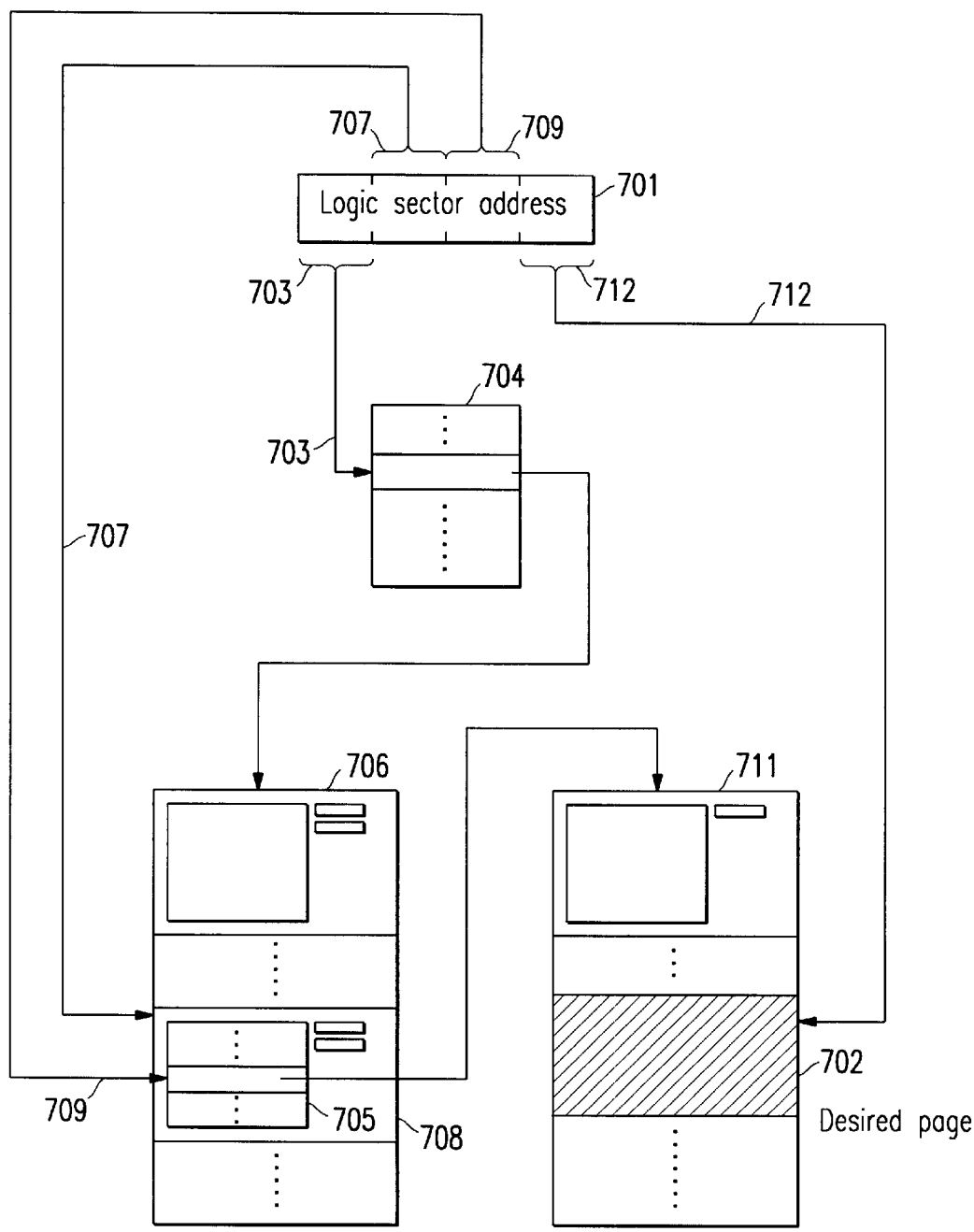
FIG. 7 is an explanatory view of an address conversion table in accordance with an embodiment of the present invention.

An address conversion table in accordance with another embodiment of the present invention will be described with reference to FIG. 7.

In the above-described embodiment, the array of the second address conversion table stores actual physical page addresses. However, the array of the address conversion table shown in FIG. 7 stores values that are different than physical page addresses. More specifically, the embodiment shown in FIG. 7 uses a technique to store values that are obtained through a division by dividing physical page addresses by a number that is 2 to the n-th power, for example, $(2^4)=16$. The values are called physical page group addresses. According to this technique, plural pages in the number used in the above-described division (hereinafter referred to as "page group") are managed as a unit.

A data page 702 corresponding to a logic sector address 701 is obtained in the following manner. First, bits 703 of the logic sector address 701 and a first address conversion table 704 stored in a RAM 105 are used to obtain a physical page group address of a page group 706 that contains a second conversion table 705.

Next, a management page 708 that contains the second address conversion table 705 is selected based on the page group 706 and bits 707 of the logic sector address 701. Further, a physical page group address of a page group 711 that contains the desired page 702 is obtained based on the second address conversion table 705 and bits 709 of the logic sector address 701. Lastly, a physical page address of the desired page 702 is obtained based on the page group 711 and bits 712 of the logic sector address 701.

In accordance with this technique, only the size of the unit that is managed is larger than in the above-described embodiment, but the construction, operation and effects are similar to those in the above-described embodiment. When the size of a page group is the same as the size of a block, for example, when one page contains 512 bytes, and one page group contains 16 pages, an erasing operation for a flash EEPROM is performed in units of page groups. Accordingly, in the garbage collection process, unnecessary pages can be more readily erased to provide a condition ready for the writing operation.

Also, because of the larger size managing unit, when writing or reading data extending across a plurality of pages is frequently requested, data can be written or read all together, and therefore a higher processing speed is achieved.

Further, because of the larger size of the management unit, the frequency of writing data in a particular page is reduced, and the frequency of using pages is relatively evenly distributed across the pages so that a memory card as a whole has a longer service life. The management in units of page groups is also applicable to the link pages.

A method for improving the reliability of data to be stored in a memory card by the use of error correction check data will be described below.

Error correction check (ECC) data is calculated based on data to be written in each page. For recovering data based on the Hamming distance, a known method may be used. For example, when the size of each page excluding its redundant section is 512 bytes, 3 bytes can be used for error correction check data. For calculation of error correction check data, a known method, such as, the one described in "Theory of Data and Code" (by Miyakawa et al., published by Iwanami Books in 1983) may be used.

In accordance with the present invention, when a request to write data is processed, error correction check data is calculated before, after or in step S 410, and stored in the flash EEPROM 104.

Error correction check data can be stored in a redundant section of a page at a physical page address y where the data is written. According to this method, all images of the data section and the redundant section of the page at the physical page address y are formed and stored in the RAM 105. As a result, the error correction check data can be written at the same time the data is written in the page according to the request provided from the host computer.

A management page disposed at a physical page address x or p can be provided with an array having elements in the same number of data pages that are managed by the management page, and elements for indexes in the array corresponding to the respective data pages may be stored as the above-described error correction check data. In accordance with this method, when a management page is located at the physical page address x, the error correction check data is written in the management page, using the over-write function of a flash EEPROM. On the other hand, when a management page is located at the physical page address p, when an image of the management page is formed in the RAM 105, an image of the error correction check data may also be formed. As a result, the error correction check data can be written at the same time the second address conversion table is written in the management page.

Further, error correction check data is also calculated for data of the second address conversion table stored in a management page, and stored in the management page in a similar manner as the data page.

On the other hand, when data is read based on a request from the host computer, in addition to transferring the data to the RAM 105 in the above-described step S 304, error correction check data corresponding to the data is also read out, and an error correction process is performed based on the data transferred to the RAM 105 and the error correction check data read out. For the calculation, a known method can be used as described above.

After the error correction process is performed, the data in the RAM 105 in which the error correction process has been completed is transferred through the interface 102.

By the method described above, the reliability of data stored in management pages and data pages in the flash EEPROM 104 is improved, and the capability of recovering data is improved even when the data is corrupted.

A second address conversion table in accordance with another embodiment of the present invention will be described with reference to FIG. 8.

As described above, a data writing operation for an EEPROM is performed in units of pages, and an erasing operation is performed in units of blocks. A method for forming a second address conversion table in association with these operations is described below.

For obtaining a new second address conversion table, a new block is obtained. When one block contains 16 pages, the second address conversion table can be renewed up to sixteen times by using the block. The same method as described above may be used to determine which one of the second address conversion tables is effective.

When the second address conversion table is renewed, there is an occurrence of writing data in a page that is referred by the second address conversion table. In the above-described embodiment, a management data area of a redundant section of a page stores data that indicates as to whether or not the page is effective. However, if the data is stored in the management page, each data page does not have to be accessed to check which a data page is effective at the start of the operation. As a result, the starting time is shortened.

Figure 8:
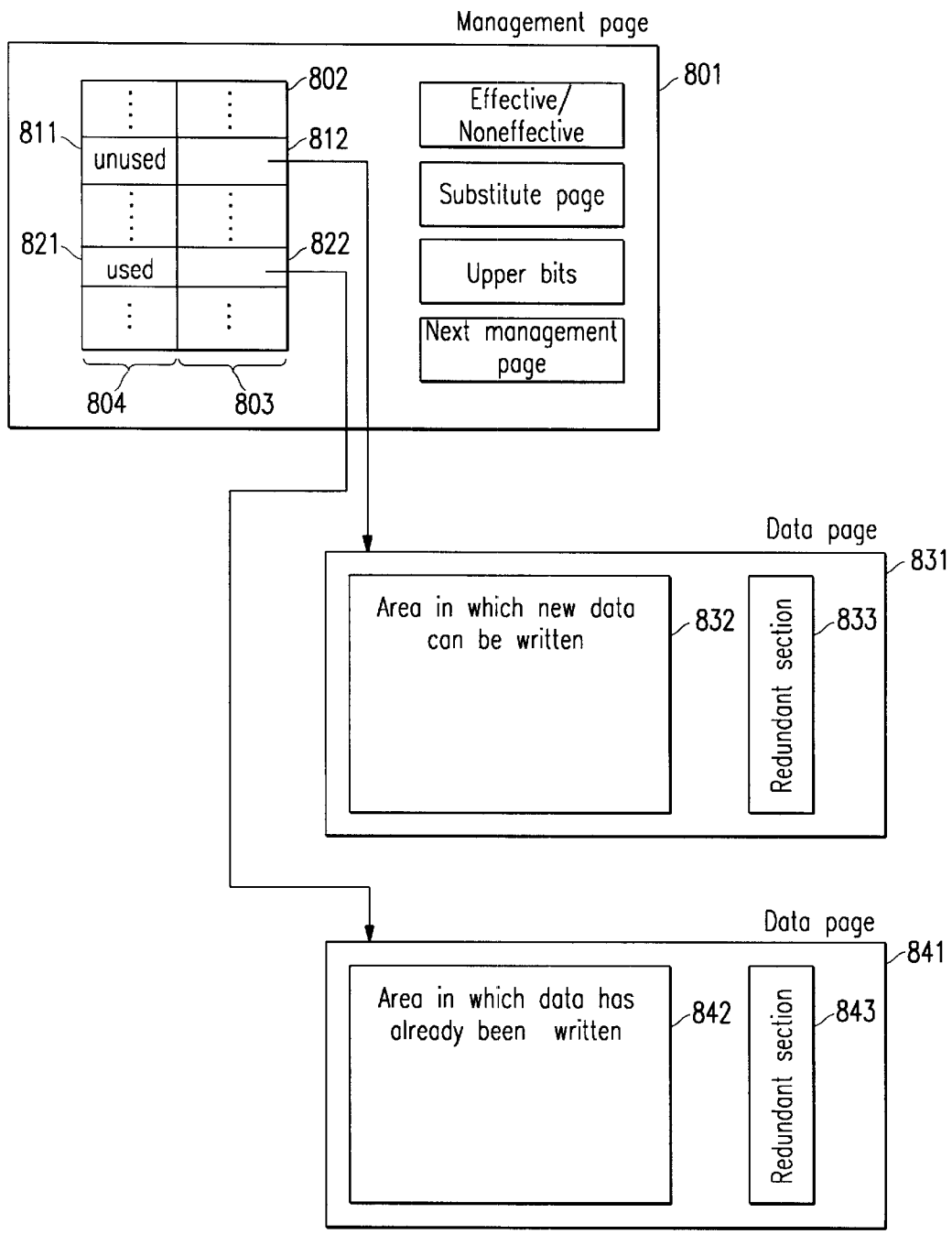
FIG. 8 is an explanatory view of an address conversion table in accordance with an embodiment of the present invention.

A management page 801 shown in FIG. 8 stores a second address conversion table 802 that contains an array a 803 storing physical page addresses of pages to be referred, and an array b 804 storing statuses of the pages to be referred. For example, when an index for referring to the array is i, a determination can be made based on a value stored at b [i] as to whether or not data is written in a data page located at a physical page address a [i].

When there is an occurrence of the renewal of data for anyone of data pages referred by the management page 801, a new management page is obtained, and the array a 803 and the array b 804 are copied as they are except the i-th element. The i-th element is processed in different manners depending on different conditions described as follows.

(1) When the value at b [i] indicates that "data can be written", the value a [i] is copied as it is on a new management page, and data indicating that "data is already written" is stored at b [i].

(2) When the value at b [i] indicates that "data is already written", a physical page address of a new data page is stored as the value a [i] in a new management page, and a value indicating that "data is already written" is stored as the value b [i].

In the embodiment described with reference to FIG. 8, the second address conversion table is referred in units of pages. However, it can be referred in units of blocks. In other words, in a manner similar to the management page, one block can contain a plurality of data pages. Accordingly, the second address conversion table may store block numbers of blocks that contain pages to be referred. The same method used in the above-described embodiment may be used to determine as to which one of the data pages is the latest one and which one of the data pages is currently effective in a block located at a block number that is stored in the second address conversion table.

In accordance with this embodiment, data pages stored in the same block can correspond to the same logic sector address. Therefore, if the data-writing operation is performed sixteen times with respect to the same logic sector address, data at each writing operation is written in the same block. When one more writing operation is performed, data is written in the first page of a new block. On the other hand, since all the data stored in the old block (in which data is written sixteen times) are unnecessary, the contents in the pages can be erased so that the pages can be used to store other data. In a flash EEPROM, an erasing operation is performed in units of blocks in accordance with this embodiment. Therefore, this embodiment provides a great advantage to the management of storage areas. The same applies to blocks containing management pages.

A link page in accordance with another embodiment of the present invention will be described below. In the above-described embodiment, a link page stores the same values as those stored in the first address conversion table. However, in accordance with another embodiment, a management page is provided with an area that stores "a physical page address of a next management page", and all management pages are linked in the form of a list. A link page stores only the head physical page address in the list of the linked management pages. In this embodiment, a link page may be renewed only when the garbage collection process changes the order of the management pages. As a result, the number of renewal operations is substantially reduced.

When the latest "physical page address of the head management page" is obtained, then the list is successively referred so that all the effective management pages can be traced.

In the embodiment shown in FIG. 8, pluralities of management pages are disposed in blocks. In this case, it is advantageous in terms of storage capacity if the management pages are linked in the form of a list in units of blocks instead of in units of pages. In this case, a block containing management pages (management block) may be provided with an area to store data representative of "a block number of a next management block".

The RAM 105 can be provided with a bit map table to be used to search for unused pages within the flash EEPROM 104 at high speed. The CPU searches for unused pages, using the bit map when it receives a write request from the host computer.

Further, a data compression/decompression circuit (not shown) and a RAM for a sliding dictionary (not shown) may be connected through the bus 106, so that data stored in each of the pages in the flash EEPROM is compressed by the Lempel-Ziv (LZ) method or the like to store more data, so that the apparent storage capacity of the memory card 101 is made larger.

Furthermore, the present invention is applicable to an embodiment in which the host computer does not directly designate logic sector addresses as locations to read or write data. In this embodiment, cylinder numbers, cluster numbers, header numbers, and the like, are designated. Logic sector addresses are calculated based on these numbers before the reading process or the writing process is performed.

Also, in accordance with the present invention, a process needs to be performed so that physical page addresses of data pages are stored in management pages before a memory card is used. This process may be done before shipping from the factory, or a program to perform a formatting process may be performed by the CPU 102.

A second embodiment of the present invention will be described below. In accordance with the second embodiment, second address conversion tables are renewed in units of pages, and the second address conversion tables store physical block addresses as physical locations. In the second embodiment, management of stored data (including data in which the host computer requests to read or write and data for second address conversion tables themselves) is performed in units of blocks. As a result, the access speed is further improved compared to the first embodiment.

In the second embodiment, the following units are used for values that are stored in storage areas of a flash EEPROM.

1 page=512 bytes (plus a redundant section)
1 block=16 pages

For the unit used by the host computer for reading and writing data, the following value is used.

1 sector=512 bytes

Therefore, the second embodiment uses a technique in which data of 16 sectors are stored for one block. In other words, the host computer designates 16 sectors in a group. This group is called a sectors-group.

A sectors-group may include a plurality of sectors designated by a series of sector numbers. In this case, a sectors-group 0 includes sectors having sector numbers 0 through 15, a sectors-group 1 includes sectors having sector numbers 16 through 31, . . . and a sectors-group 1023 includes sectors having sector numbers 16368 through 16383. When 1024 sectors-groups, i.e., sectors-groups 0 through 1023 are used, the host computer recognizes a non-volatile memory apparatus as having a storage capacity of 512×16×1024= 8388608, bytes (8 Megabytes).

On the other hand, in the second address conversion table stored in the flash EEPROM, 128 sectors-groups are managed as a unit. 128 sectors-groups are used because management data for 128 sectors-groups can be stored in one page. 128 sectors-groups are called a sectors-groups-unit. According to the above-described units, the number of sectors-groups-units is 1024/128=8.

In a similar manner as described above, a sectors-groups-unit 0 includes sectors-groups 0 through 127, a sectors-groups-unit 1 includes sectors-groups 128 through 255, . . . and a sectors-groups-unit 7 includes sectors-groups 896 through 1023.

In the second embodiment, when the second address conversion table is optimized (a garbage collection process is performed), the entire second address conversion table can be stored in one block. However, the size of the second address conversion table may be larger than the size of one block. With renewal operations, pages that store data for old sectors-groups-units increase, and the size of the second address conversion table increases. As a result, the second address conversion table, at one time, may extend across a plurality of blocks.

Pluralities of sectors-groups-unit management pages are stored in a plurality of blocks, and the remaining area of each block is saved as a renewal area for renewing the sectors-groups-unit management page. In accordance with this embodiment, when all the renewal areas are used up, a new empty block is obtained, and link data for linking to the new block (a physical block address of the block, i.e., a block number of the block) is stored in the original block (in which the renewal areas are used up).

It is noted that the units used herein can be changed depending on the requirements in other embodiments, and such embodiments are also included in the scope of the present invention.

Figure 9:
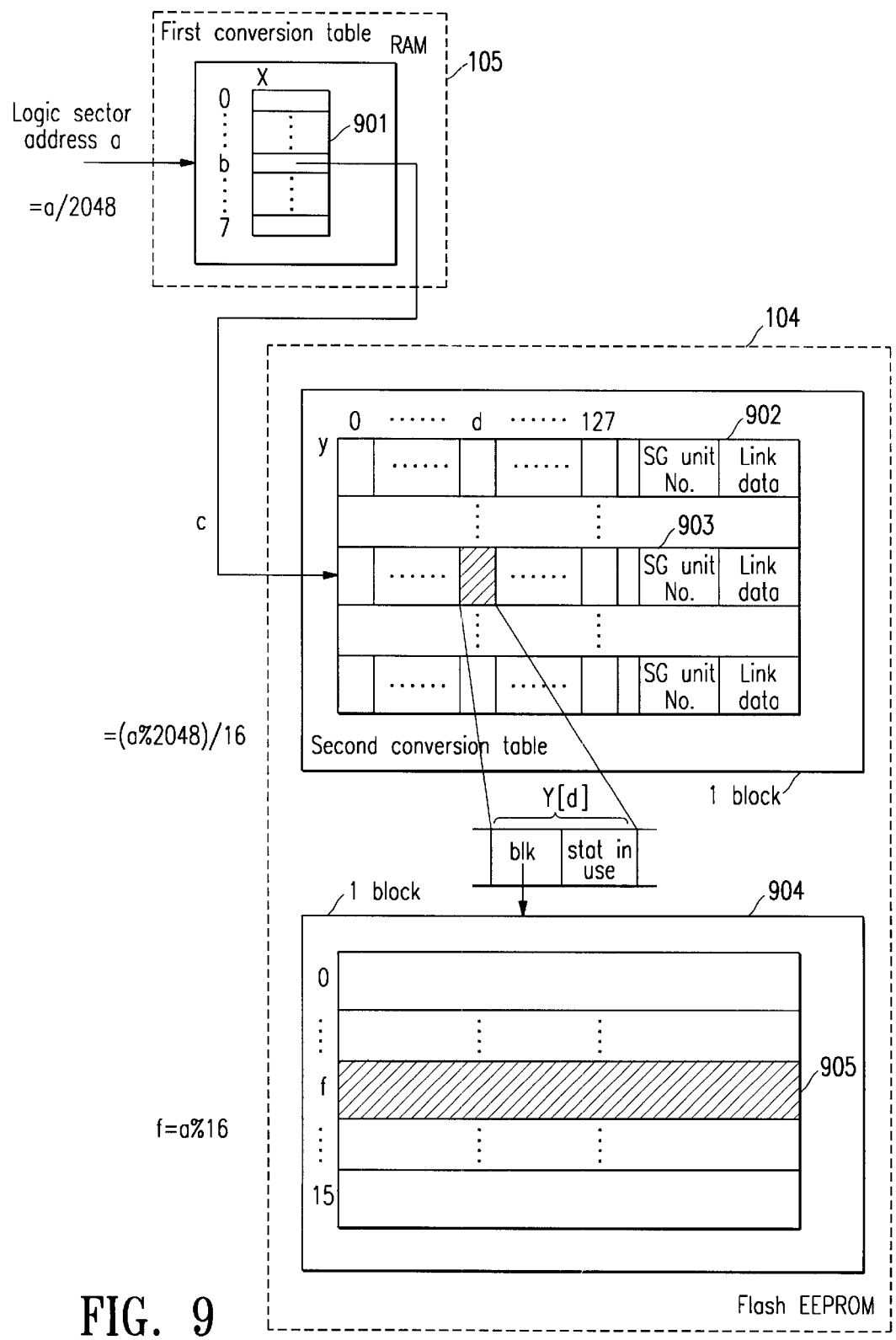
FIG. 9 is an explanatory view schematically illustrating a memory management in a memory card in accordance with a second embodiment of the present invention.

An outline of storage management in a memory card in accordance with the second embodiment will be described below with reference to FIG. 9. FIG. 9 shows an explanatory view of an outline of storage management in a memory card in accordance with the second embodiment.

The host computer issues an access request for writing or reading data by designating a logic sector number. For example, the logic sector number is defined as a.

Based on the designated logic sector number a, a first address conversion table 901 stored in the RAM 105 is referred. The RAM 105 stores an array of physical page addresses of second address conversion tables 902. For example, the array is defined as X. The logic sector number a can be directly used as an index of the array. In this case, a physical page address of the second address conversion table 902 is calculated by X [a].

On the other hand, when a sectors-groups-unit number of a sectors-groups-unit containing a sector designated by the logic sector number a is used, the overall size of the array becomes smaller. Accordingly, the storage capacity of the RAM 105 can be made smaller, and the cost is reduced.

For example, a sectors-groups-unit number b of a sectors-groups-unit containing a sector designated by the logic sector number a is obtained by the following calculation. It is noted that, in the following calculation, a mark "/" means division, and a mark ">>" means arithmetic shift right.

$$b=a/(16\times 128)=a/2048=a>>11$$

A physical page address c=X[b] is obtained based on the array X of the first address conversion table 901 that is stored in the RAM 105, using the sector-groups unit number b as an index.

A page designated by the physical page address c is a page within the flash EEPROM 104, and forms a part of the second address conversion table 902. The page designated by the physical page address is called a sectors-groups-unit management page.

The sectors-groups-unit management page 903 stores data including the following data.

Numbers of sectors-groups-units managed by the sectors-groups-unit management page.

Array Y that manages sectors-groups.

Link data storing a physical block address (block number) of the present block, when the page is disposed at the end of the block, and when the second address conversion table 902 extends over to a block other than the present block, so that the present block can be referred from the block containing the extended second address conversion table 902.

In the sectors-groups unit management page 903, 128 sectors-groups are managed by an array Y. Each element of the array Y stores data including the following data.

Physical block address expressed as "blk".

Current status of the physical block address expressed as "stat".

A sectors-group including a sector defined by the logic sector number a is managed by an element Y[d] of the array in a sectors-groups-unit management page c. A value d is obtained by the following calculation. In the calculation, a mark "%" means a calculation to obtain a residual of division by an integer, and a mark "&" means bit-AND of integers.

$$d=(a\ \%\ (16\times 128))/16=(a\ \&\ 2047)/16$$

Among data included in the element Y[d] of the array, the physical block address is expressed as Y[d].blk, and the present status of the block is expressed as Y[d].stat.

When the logic sector address a is designated, a physical block address (block number) of a block including a page that stores data for the sector is obtained by calculating e=Y[d].blk.

A block 904 designated by the block number e includes a page 905 that stores data for a sector designated by the logic sector number a. The block 904 includes 16 pages, and the page 905 that stores data for the sector designated by the logic sector number a is an f-th page among the 16 pages. The page number f is obtained by the following calculation.

$$f=a\ \%\ 16=a\ \&\ 15$$

In this manner, a physical location corresponding to a logic sector address is obtained based on the physical block address (block number) e, and the page number f therein.

Figure 10:
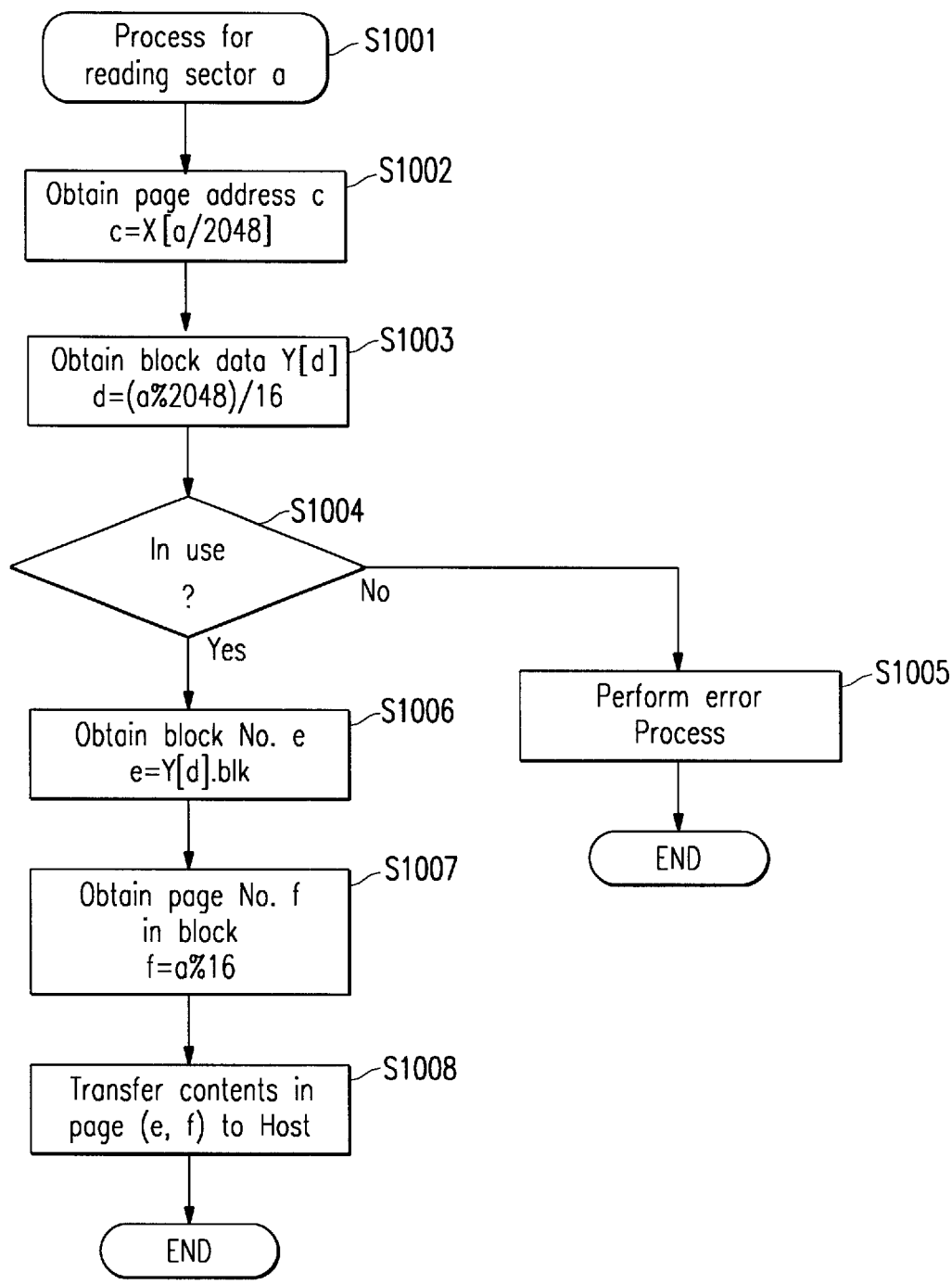
FIG. 10 is a flowchart illustrating a method for reading data from the memory card in accordance with the second embodiment.

A method for reading data from a memory card in accordance with the second embodiment of the present invention will be described with reference to FIG. 10. FIG. 10 shows a flowchart of a method for reading data from a memory card in accordance with the second embodiment of the present invention.

A reading process starts (step S 1001) when the host computer issues a request to read data, designating a logic sector address a, and the request is received.

A physical page address c within a second address conversion table 902 is obtained based on the logic sector address a and an array X of a first address conversion table 901 by calculation c=X[a/2048] (step S 1002).

Next, data Y[d] for a block that contains a page corresponding to the logic sector address a is obtained based on an array Y of the second address conversion table 902 that is contained in a page at the physical page address c by calculation d=(a % 2048) /16 (step S 1003).

Then, a determination is made as to whether or not the block status data Y[d].stat indicates "in use" (step S 1004). The statuses may include "usable", "in use", and the like. For reading data, the status should be "in use". When the status is not "in use" (step S 1004; No), an error process is performed (step S 1005), and the present process ends. The error process includes a process of reporting the current status to the host computer.

On the other hand, when it is "in use" (step S1004; Yes), a physical block address (block number) e of a block that includes a page corresponding to the sector is obtained by calculation e=Y[d].blk (step S1006).

Furthermore, a page number f within the block e is obtained by calculation f=a % 16 (step S1007).

Lastly, data in a page designated by the block number e and the page number f within the block is read out, and transferred to the host computer (step S1008), and the present process ends.

In the reading process in accordance with the first embodiment, steps S303 and S304 are repeatedly performed. However, in the reading process in accordance with the second embodiment, such repetition of steps is not required. As a result, a faster reading process is achieved.

Because the repetition of steps is not required, the writing process requires a special scheme as described below.

Figure 11:
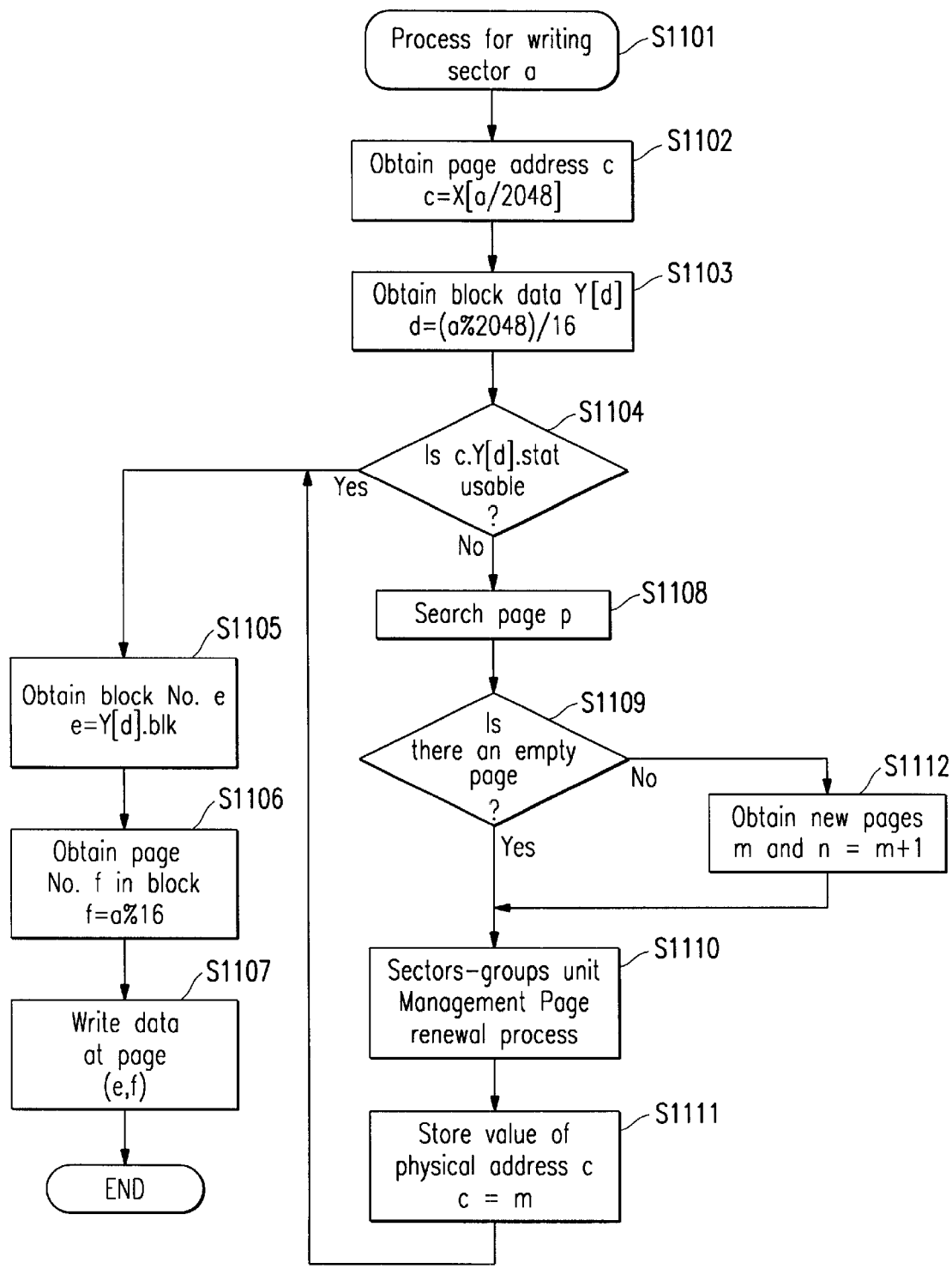
FIG. 11 is a flowchart illustrating a method for writing data in the memory card in accordance with the second embodiment.

Referring to FIGS. 11, 12(*a*) and 12(*b*), a method for writing data in a memory card in accordance with the second embodiment will be described. FIG. 11 is a flowchart illustrating a method of writing data in a memory card in accordance with the second embodiment, and FIGS. 12(*a*) and 12(*b*) illustrate the method for writing data in a memory card.

A writing process starts (step S 1101) when the host computer issues a write request designating a logic sector address a, and such request is received.

A physical page address c within a second address conversion table 902 is obtained based on the logic sector address a and an array X of the first address conversion table 901 by calculation c=X[a/2048] (step S 1102).

Next, data Y[d] for a block that contains a page corresponding to the logic sector address a is obtained based on an array Y of the second address conversion table 902 that is contained in a page at the physical page address c by calculation d=(a % 2048) /16 (step S 1103).

Then, a determination is made as to whether or not the block status data Y[d].stat indicates "usable" (step S 1104). When the status is "usable" (step S 1104; Yes), this indicates that writing is performed for the first time with respect to a sectorsgroup containing a sector a that is subjected to writing.

Then, a physical block address (block number) e of a block that includes a page corresponding to the sector is obtained by calculation e=Y[d].blk (step S1105).

Furthermore, a page number f within the block e is obtained by calculation f=a % 16 (step S 1106).

Lastly, data designated by the host computer is written in a page designated by the block number e and the page number f within the block, and Y [d].stat is renewed to "in use" (step S1107), and the process ends.

On the other hand, when the block status data Y [d].stat is not "usable" (step S1104; No), a sectors-groups-unit management page that stores an array Y including an element in which the block status data is "usable" is searched (step S1108). For example, a physical page address of the sectors-groups-unit management page is p. In the following explanation, an array within a sectors-groups-unit management page c is expressed as c.Y.

An array Y of the sectors-groups-unit management page at the address p manages blocks that are "usable". In other words, integers q in which p. Y [q].stat is "usable" exist.

In the process for searching an empty block in step S1108, a high-speed search by the bit map table in accordance with the first embodiment can be performed.

Next, a determination is made as to whether or not a renewal area of the block that stores the second address conversion table 902 has two pages (step S1109). Renewal results of the page c and page p are stored in these two pages.

When the renewal area of the block that stores the second address conversion table 902 has two pages (step S1109; Yes), the process proceeds to step S1110. For example, when physical page addresses of the obtained empty pages are m and n=m+1, the following operation is performed.

A renewal operation of sectors-groups-unit management pages for pages c, p, m and n is performed (steps S1110). This operation will be described with reference to FIGS. 12(a) and 12(b).

Figure 12A:
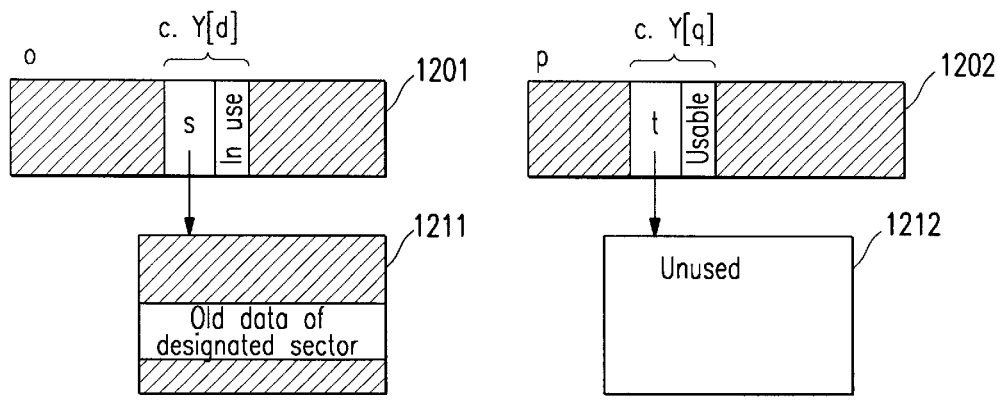
FIGS. 12(a) and 12(b) are explanatory views illustrating a method for writing data in the memory card.

FIG. 12(a) is an explanatory view illustrating a status of data stored in pages c and p before the step S 1110 (FIG. 11) is performed.

In the page c 1201, c.Y [d] indicates a block 1211 storing the original data of the sector a. In other words, a block number s of the block 1211 is defined by s =c. Y [d]. blk. Also, c.Y [d]. stat indicates "in use".

In the page p 1202, p.Y [q] indicates an empty block 1212. A block number of the empty block 1212 is defined by t=p.Y [q]. blk. Also, p.Y[q].stat indicates "usable".

At the first status, all pages in a block are erased. In this line, page m and page n are in the first status.

Figure 12B:
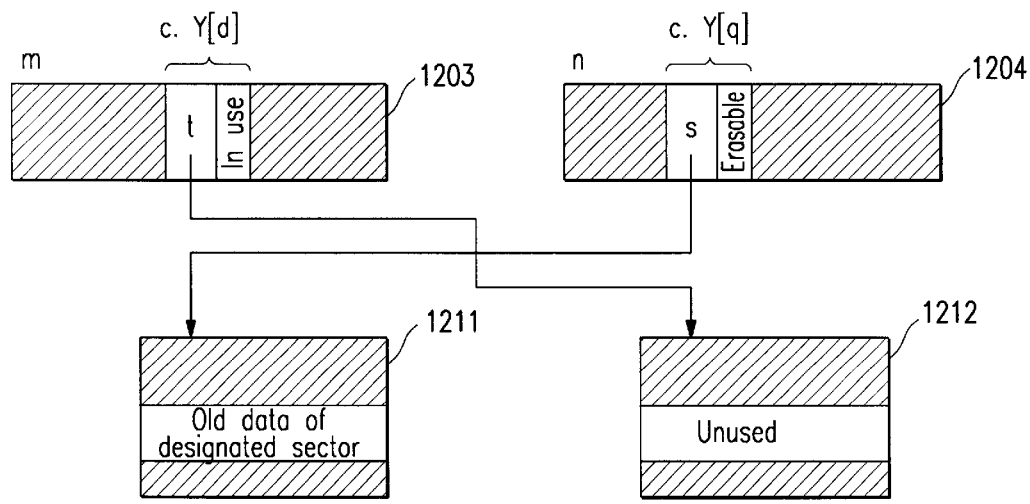

FIG. 12(b) is an explanatory view illustrating the status of data stored in the pages m and n before step S1110 (FIG. 11). Data stored in the pages c and p are the same as the data shown in FIG. 12(a), and thus the explanation thereof is omitted.

The page m 1203 generally stores the same values as the values stored in the page c 1201 except that a value stored at m.Y [d]. blk is t, and a value stored at m.Y [d]. stat indicates "in use". At this moment, the value of m.Y[d].stat indicates "in use", a value of Y [d]. stat is not required to be renewed in step S1107 (FIG. 11) which is later performed.

On the other hand, the page n 1204 stores the same values as the values stored in the page p 1202 except that a value stored in n.Y[q].blk is s, and a value stored in n.Y [q]. stat indicates "erasable".

In other words, physical block addresses are "exchanged" between the block s 1211 that is in use and the empty block t 1212 that is usable.

Further, in step S1110 (FIG. 11), contents in the old block s 1211 are unchanged, but contents in pages other than (f=a % 16)-th page among the old block s 1211 are copied in a new block t 1212. Writing operation for the f-th page is performed in a process step S1107 that is later performed.

In this embodiment, the writing operation with respect to the new block t 1212 is divided and performed in step S1110 and step S1107 (FIG. 11). However, in another embodiment, the entire block may be copied in step S1110 and the writing operation for the page may not be performed in step S1107.

Further, in step S1110, an appropriate sectors-groups-unit number is stored in each of the pages c, p, m and n.

Lastly, in step S1110, the first address conversion table is renewed. First, a value X [a/12048] of an element of the array in the first address conversion table that is stored in the RAM 105 is renewed to a page number of the newly obtained page m 1203. Then, where there is an element in the array having a value p, in other words, one element defined by a formula X [I]=p, the value of this element is renewed to a page number n of the newly obtained page n 1204.

After the renewal process for the sector-groups unit management page in step S1110, a value m is adapted as a new value of the physical page address c (step S1111), the process proceeds to step S1105. For a value d, the same value calculated in step S1103 (d=(a % 2048)/16) is used. Since the appropriate values are stored in the above-described renewal process step S1110, Y [d]. stat is not required to be checked in step S1103 through step S1104.

When a renewal area of a block that stores the second address conversion table 902 does not have two empty pages (step S1109; No), a new empty block is searched, the physical block address (block number) of the original block is stored in a link data area disposed in the last page of the new block, the first two pages of the new block are defined as newly obtained empty pages, physical page addresses m and n=m+1 of the pages are obtained (step S1112), and the process proceeds to step S1110.

In step S1112, if no sectors-groups-unit management page that stores an array including an element in which the block status data is "usable" is found, a management page including used blocks is referred, and the used blocks are erased to obtain new empty pages m and n. Then, the process proceeds to step S1110.

When c and p are the same, although not shown in the flowchart, block numbers in the same sectors-groups-unit management page c may be exchanged, in a similar manner as described above. In this case, only one new sectors-groups-unit management page needs to be obtained from the renewal area.

In another embodiment, the process to obtain two empty pages in step S1109 may be performed in a manner that a set of the page c and page m and a set of the page q and the page n are disposed in the same blocks, respectively. Alternatively, these sets may be disposed in blocks that are linked with each other. In this case, the values n and m do not necessarily satisfy the formula n=m+1. This embodiment is applicable to the case where there are many sectors-groups-unit management pages so that all of them cannot be disposed in one block.

When there are many sectors-groups-unit management pages, a plurality of sectors-groups-unit management pages are grouped into a sectors-groups-unit management pages-group. A sectors-groups-unit management pages-group is stored in one block, and pluralities of pages are provided as renewal areas in the block.

When a block containing a sectors-groups-unit management pages-group runs out of empty renewal areas, the block is appropriately linked to other blocks. The linked blocks are called a sectors-groups-unit management blocks-group.

When a new block is linked to a sectors-groups-unit management blocks-group, a block number of the new block is stored in a link block provided in a fixed area in the flash EEPROM.

When there are a few sectors-groups-unit management pages and there is only one sectors-groups-unit management blocks-group, there is one block number for a lastly obtained block to be stored in the link block. Values of such block numbers are successively stored from the head of the link block.

When there are many sectors-groups-unit management pages, and there are plural sectors-groups-unit management blocks-groups, block numbers for lastly obtained blocks are successively stored in the link block from the head of the link block in units of blocks-groups.

A sectors-groups-unit management blocks-group is linked by link data stored in the last page of each block. Linking is performed by referring from a newly obtained block to an old block. Therefore, if a block number of each lastly obtained block is stored in the link block, all of the sectors-groups-unit management blocks that store necessary management data can be successively accessed by tracing link data from a new block to an old block.

In an embodiment in which bit map tables are used, a renewal process for necessary bit map tables is performed in step S1107. is Also, for obtaining an empty block in step S1112, a process that is similar to the renewal process for sectors-groups-unit management pages in steps S1108 through step S1111 is performed. In this manner, management of blocks that store data is performed in a manner similar to management of blocks that store sectors-groups-unit management pages.

Figure 13:
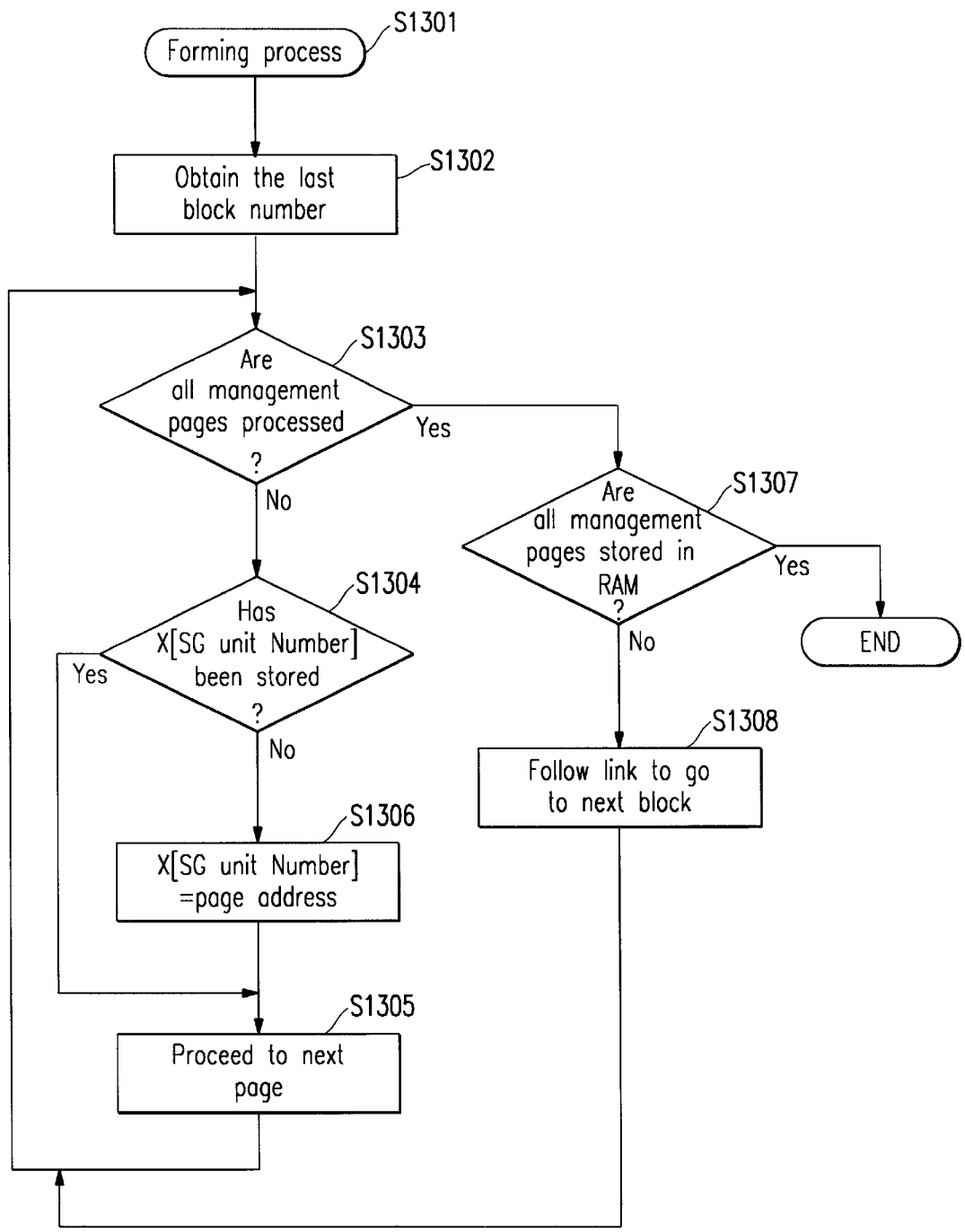
FIG. 13 is an explanatory view illustrating a method for forming a first address conversion table in the memory card in accordance with the second embodiment.

Referring to FIG. 13, a method of forming a first address conversion table 901 with respect to a memory card in a second embodiment will be described. The description will be made with reference to an example in which there is one sectors-groups-unit management blocks-group. In the case of a plurality of sectors-groups-unit management blocks-groups, the following method is repeated for each of the groups.

The forming process starts when a memory card is powered-on (step S1301 ).

First, the block number of a block lastly obtained as a sectors-groups-unit management block is obtained from the link block provided in a fixed area within the flash EEPROM (step S1302).

A determination is made as to whether all of the sectors-groups-unit management pages within a block designated by the obtained block number are processed (step S1303). When they are not completed (step S1303; No), the following process is performed. When there is no sectors-groups-unit management page to be processed, the process proceeds to step S1307.

A sectors-groups unit number managed by the sectors-groups unit management page is obtained, and a determination is made as to whether a physical page address is already stored in X[SG unit number], an area designated by an index that defines the sectors-groups unit number in the array of the first address conversion table 901 within the RAM (step S1304). When a physical page address is already stored (step S1304; Yes), the sectors-groups-unit management page stores old data. Accordingly, the method proceeds to the next sectors-groups-unit management page (step S1305), and the process returns to step S1303.

On the other hand, when a physical page address is not yet stored in X[SG unit number], (step S1304; No), the sectors-groups-unit management page stores the latest data. Accordingly, a physical page address of the sectors-groups-unit management page is stored in X[SG unit number], an area designated by an index that defines the sectors-groups-unit number in the array of the first address conversion table 901 within the RAM (step S1306), and the process proceeds to step S1305.

When there is no sectors-groups-unit management page to be processed (step S1303; Yes), a determination is made as to whether physical page addresses of all necessary sectors-groups-unit management pages are stored in the array of the first address conversion table 901 within the RAM with respect to the sector groups managed by the sectors-groups-unit management block being processed (step S1307).

When they are stored (step S1307; Yes), the present process is finished.

On the other hand, when there are some physical page addresses that are not stored in the array, link data of the block that is being processed is referred, a block that is one stage older than the currently processed block is selected for the process (step S1308), and the process returns to step S1303.

In the second embodiment, an error check process can also be performed in a manner similar to the first embodiment.

In other embodiments, an address conversion table stored in a RAM that is a volatile memory apparatus may be divided in multiple stages, for example, two stages. More specifically, first, a physical location of a second address conversion table stored in a RAM is obtained based on a first address conversion table stored in the RAM and a part of a logic sector address. Next, a physical location of a third address conversion table stored in a flash EEPROM is obtained based on the second address conversion table stored in the RAM and a part of the logic sector address. Further, a physical location of data to be accessed within the flash EEPROM is obtained based on the third address conversion table stored in the flash EEPROM and a part of the logic sector address. Finally, the physical location within the flash EEPROM is accessed.

This embodiment is generally the same as the above-described embodiment with the exception that the stages of address conversion tables to be stored in the RAM are increased. With respect to forming address conversion tables to be stored in multiple stages, data can be stored in a tree-structured format.

In accordance with the above-described embodiments of the present invention, the following objects are achieved. There are provided a non-volatile memory apparatus and a method for controlling the apparatus that are capable of reading and writing data by designating a logic sector address. Secondly, there are provided memory cards, such as ATA cards and SSFDC cards and methods for controlling thereof that can designate a data storage location by the same method as that used for hard disks and floppy disks. Thirdly, there are provided a non-volatile memory apparatus having a flash EEPROM and a RAM in which conversion tables for converting logic sector addresses to be designated upon reading and writing data into physical page addresses in the flash EEPROM are divided and stored in the flash EEPROM and the RAM. There is also provided a method for controlling the apparatus. Fourth, a non-volatile memory apparatus and a method for controlling the apparatus achieve a short preparation time from the power-on until the time reading and writing operations are ready. Fifth, the present invention provides a non-volatile memory apparatus having a non-volatile memory device wherein even when a writing operation with respect to the non-volatile memory device is in principle limited to one single writing operation after data stored therein is erased, the non-volatile memory device is effectively managed, and also provides a method for controlling the apparatus. Sixth, the present invention provides a non-volatile memory apparatus and a method for controlling the apparatus that improves the reliability of data that is stored in the flash EEPROM, and is capable of correcting data even when a part of the data is corrupted. Seventh, the present invention provides a non-volatile memory apparatus and a method for controlling the apparatus that is capable of faster access by renewing stored data in units of blocks. Eighth, the present invention provides data storage media for storing programs for performing the above-described controls so that the program can be readily sold or distributed as software products independently of non-volatile memory apparatuses. By performing a program stored in the data storage medium in accordance with the present invention, a non-volatile memory apparatus and a method for controlling a non-volatile memory apparatus in accordance with the above-described embodiments are realized, and the same effects as those of the above-described embodiments are achieved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A non-volatile memory apparatus comprising:
    a receiving device that receives one of a request to write data at a logic sector address and a request to read data from a logic sector address that is transmitted from a host computer;
    a volatile memory device that stores a first address conversion table;
    a non-volatile memory device that stores a second address conversion table and data;
    first program code that obtains a physical location of the second address conversion table stored in the non-volatile memory device based on the logic sector address relative to the request received by the receiving device and the first address conversion table stored in the volatile memory device;
    second program code that obtains the second address conversion table stored in the non-volatile memory device based on the physical location obtained by the first program code, and obtains a physical location in the non-volatile memory apparatus at which data is written or read based on the logic sector address relative to the request received by the receiving device and the second address conversion table; and
    a data access device that writes the data relative to the request which is received by the receiving device, or reads the data relative to the request which is received by the receiving device, with respect to the physical location of the non-volatile memory device obtained by the second address obtaining device.

2. A non-volatile memory apparatus according to claim 1, further comprising third program code that checks a correspondence between the logic sector address and the physical location based on the second address conversion table stored in the non-volatile memory device to thereby form the first address conversion table, and stores the first address conversion table in the volatile memory device.

3. A non-volatile memory apparatus according to claim 1, further comprising fourth program code that, when the data access device writes in the non-volatile memory device the data relative to the request that is received by the receiving device, stores error correction check data for the data in the non-volatile memory device, and that, when the data relative to the request received by the receiving device is read, corrects an error of the read data based on the error correction check data stored in the non-volatile memory device.

4. A non-volatile memory apparatus according to claim 1, wherein the physical location in the non-volatile memory device that is stored in the second address conversion table is designated in units of blocks each containing a plurality of pages.

5. A non-volatile memory apparatus according to claim 1, further comprising fifth Program code that renews the second address conversion table stored in the non-volatile memory device so that a physical location of a storage area in the non-volatile memory device wherein data can be written is referred to instead of the physical location obtained by the second program code.

6. A non-volatile memory apparatus according to claim 5, wherein the fifth program code renews the second address conversion table in units of pages of the non-volatile memory device.

7. A non-volatile memory apparatus comprising:
    a volatile memory device for storing a first address conversion table;
    a non-volatile memory device including a first memory area for storing a second address conversion table and a second memory area for storing data
    a receiving device that receives a request to read data or write data at a logic sector address in the non-volatile memory;
    first program code that obtains a physical location of the second address conversion table stored in the non-volatile memory device based on the logic sector address relative to the request received by the receiving device and the first address conversion table stored in the volatile memory device; and
    second program code that obtains the second address conversion table stored in the non-volatile memory device based on the physical location obtained by the first program code, and obtains a physical location in the non-volatile memory apparatus at which the data is written or read based on the logic sector address relative to the request received by the receiving device and the second address conversion table.

8. A non-volatile memory apparatus according to claim 7, further comprising third program code that checks a correspondence between the logic sector address and the physical location based on the second address conversion table stored in the non-volatile memory device to thereby form the first address conversion table, and stores the first address conversion table in the volatile memory device.

9. A non-volatile memory apparatus according to claim 7, wherein the physical location in the non-volatile memory device that is stored in the second address conversion table is designated in units of blocks each containing a plurality of pages.

10. A non-volatile memory apparatus according to claim 7, further comprising a data access device that writes the data relative to the request which is received by the receiving device in the non-volatile memory device at the physical location obtained by the second program code, or reads the data relative to the request which is received by the receiving device from the non-volatile memory device at the physical location obtained by the second program code.

11. A non-volatile memory apparatus according to claim 10, further comprising fourth program code that, when the data access device writes in the non-volatile memory device the data relative to the request that is received by the receiving device, stores error correction check data for the data in the non-volatile memory device, and that, when the data relative to the request received by the receiving device is read, corrects an error of the read data based on the error correction check data stored in the non-volatile memory device.

12. A non-volatile memory apparatus according to claim 7, further comprising fifth program code that renews the second address conversion table stored in the non-volatile memory device so that a physical location of a storage area in the non-volatile memory device wherein data can be written is referred to instead of the physical location obtained by the second program code.

13. A non-volatile memory apparatus according to claim 12, wherein the fifth program code renews the second address conversion table in unit of each page of the non-volatile memory device.

14. A method for controlling a non-volatile memory apparatus, the method comprising:
 a receiving step for receiving one of a request to write data at a logic sector address and a request to read data from a logic sector address that is transmitted from a host computer;
 a first address obtaining step for, based on the logic sector address relative to the request received by the receiving step and a first address conversion table stored in a volatile memory device, obtaining a physical location of a second address conversion table stored in a non-volatile memory device;
 a second address obtaining step for obtaining the second address conversion table stored in the non-volatile memory device based on the physical location obtained by the first address obtaining step, and obtaining a physical location in the non-volatile memory apparatus at which data is written or read based on the logic sector address relative to the request received by the receiving step and the second address conversion table; and
 a data access step for writing the data relative to the request which is received by the receiving step, or reading the data relative to the request which is received by the receiving step, with respect to the physical location of the non-volatile memory device obtained by the second address obtaining step.

15. A method for controlling a non-volatile memory apparatus according to claim 14, further comprising an address conversion table forming step for checking a correspondence between the logic sector address and the physical location based on the second address conversion table stored in the non-volatile memory device to thereby form the first address conversion table, and storing the first address conversion table in the volatile memory device.

16. A method for controlling a non-volatile memory apparatus according to claim 14, further comprising an error correction step for, when the data access step writes in the non-volatile memory device the data relative to the request that is received by the receiving step, storing error correction check data for the data in the non-volatile memory device, and when the data relative to the request received by the receiving step is read, correcting an error of the read data based on the error correction check data stored in the non-volatile memory device.

17. A method for controlling a non-volatile memory apparatus according to claim 14, wherein the physical location in the non-volatile memory device that is stored in the second address conversion table is designated in units of blocks each containing a plurality of pages.

18. A method for controlling a non-volatile memory apparatus according to claim 14, further comprising an address conversion table renewing step for renewing the second address conversion table stored in the non-volatile memory device so that a physical location of a storage area in the non-volatile memory device wherein data can be written is referred to instead of the physical location obtained by the second address obtaining step.

19. A method for controlling a non-volatile memory apparatus according to claim 18, wherein the address conversion table renewing step renews the second address conversion table in units of pages of the non-volatile memory device.

20. A data storage medium for storing a program that controls a non-volatile memory apparatus, the program comprising:
 a receiving step for receiving one of a request to write data at a logic sector address and a request to read data from a logic sector address that is transmitted from a host computer;
 a first address obtaining step, based on the logic sector address relative to the request received by the receiving step and a first address conversion table stored in a volatile memory device, for obtaining a physical location of a second address conversion table stored in a non-volatile memory device;
 a second address obtaining step for obtaining the second address conversion table stored in the non-volatile memory device based on the physical location obtained by the first address obtaining step, and obtaining a physical location in the non-volatile memory apparatus at which data is written or read based on the logic sector address relative to the request received by the receiving step and the second address conversion table; and
 a data access step for writing the data relative to the request which is received by the receiving step, or reading the data relative to the request which is received by the receiving step, with respect to the physical location of the non-volatile memory device obtained by the second address obtaining step.

21. A data storage medium for storing a program that controls a non-volatile memory apparatus according to claim 20, wherein the program further comprises an address conversion table forming step for checking a correspondence between the logic sector address and the physical location based on the second address conversion table stored in the non-volatile memory device to thereby form the first address conversion table, and storing the first address conversion table in the volatile memory device.

22. A data storage medium for storing a program that controls a non-volatile memory apparatus according to claim 20, wherein the program further comprises an error correction step for, when the data access step writes in the non-volatile memory device the data relative to the request that is received by the receiving step, storing error correction check data for the data in the non-volatile memory device, and when the data relative to the request received by the receiving step is read, correcting an error of the read data based on the error correction check data stored in the non-volatile memory device.

23. A data storage medium for storing a program that controls a non-volatile memory apparatus according to claim 20, wherein the physical location in the non-volatile memory device that is stored in the second address conversion table is designated in units of blocks each containing a plurality of pages.

24. A data storage medium for storing a program that controls a non-volatile memory apparatus according to claim 20, wherein the program further comprises an address conversion table renewing step for renewing the second address conversion table stored in the non-volatile memory device so that a physical location of a storage area in the non-volatile memory device wherein data can be written is referred to instead of the physical location obtained by the second address obtaining step.

25. A data storage medium for storing a program that controls a non-volatile memory apparatus according to claim 24, wherein the address conversion table renewing step renews the second address conversion table in units of pages of the non-volatile memory device.

26. A non-volatile memory apparatus comprising:
   a receiving device that receives one of a request to write data at a logic sector address and a request to read data from a logic sector address that is transmitted from a host computer;
   a volatile memory device that stores a first address conversion table and a second address conversion table;
   a non-volatile memory device that stores a third address conversion table and data;
   first program code that obtains a physical location of the second address conversion table stored in the volatile memory device based on the logic sector address relative to the request received by the receiving device and the first address conversion table stored in the volatile memory device;
   second program code that obtains the second address conversion table stored in the volatile memory device based on the physical location obtained by the first program code, and obtains a physical location of a third address conversion table stored in the non-volatile memory device based on the logic sector address relative to the request received by the receiving device and the second address conversion table;
   third program code that obtains the third address conversion table stored in the non-volatile memory device based on the physical location obtained by the second program code, and obtains a physical location in the non-volatile memory apparatus at which data is written or read based on the logic sector address relative to the request received by the receiving device and the third address conversion table; and
   a data access device that writes the data relative to the request which is received by the receiving device, or reads the data relative to the request which is received by the receiving device, with respect to the physical location of the non-volatile memory device obtained by the third program code.

27. A method for controlling a non-volatile memory device apparatus, comprising:
   a receiving step for receiving one of a request to write data at a logic sector address and a request to read data from a logic sector address that is transmitted from a host computer;
   a first address obtaining step for, based on the logic sector address relative to the request received by the receiving step and a first address conversion table stored in a volatile memory device, obtaining a physical location of a second address conversion table stored in the volatile memory device;
   a second address obtaining step for obtaining the second address conversion table stored in the volatile memory device based on the physical location obtained by the first address obtaining step, and obtaining a physical location of a third address conversion table stored in a non-volatile memory device based on the logic sector address relative to the request received by the receiving step and the second address conversion table;
   a third address obtaining step for obtaining the third address conversion table stored in the non-volatile memory device based on the physical location obtained by the second address obtaining step, and obtaining a physical location in the non-volatile memory apparatus at which data is written or read based on the logic sector address relative to the request received by the receiving step and the third address conversion table; and
   a data access step for writing the data relative to the request to write which is received by the receiving step, or reading the data relative to the request to read which is received by the receiving step, with respect to the physical location of the non-volatile memory device obtained by the third address obtaining step.

28. A data storage medium storing a program that controls a non-volatile memory apparatus, the program comprising:
   a receiving step for receiving one of a request to write data at a logic sector address and a request to read data from a logic sector address that is transmitted from a host computer;
   a first address obtaining step for, based on the logic sector address relative to the request received by the receiving step and a first address conversion table stored in a volatile memory device, obtaining a physical location of a second address conversion table stored in the volatile memory device;
   a second address obtaining step for obtaining the second address conversion table stored in the volatile memory device based on the physical location obtained by the first address obtaining step, and obtaining a physical location of a third address conversion table stored in a non-volatile memory device based on the logic sector address relative to the request received by the receiving step and the second address conversion table;
   a third address obtaining step for obtaining the third address conversion table stored in the non-volatile memory device based on the physical location obtained by the second address obtaining step, and obtaining a physical location in the non-volatile memory apparatus at which data is written or read based on the logic sector address relative to the request received by the receiving step and the third address conversion table; and
   a data access step for writing the data relative to the request to write which is received by the receiving step, or reading the data relative to the request to read which is received by the receiving step, with respect to the physical location of the non-volatile memory device obtained by the third address obtaining step.

* * * * *